(12) United States Patent
Arakawa

(10) Patent No.: US 7,610,471 B2
(45) Date of Patent: Oct. 27, 2009

(54) DATA PROCESSOR

(75) Inventor: Fumio Arakawa, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 242 days.

(21) Appl. No.: 11/707,150

(22) Filed: Feb. 16, 2007

(65) Prior Publication Data
US 2008/0133888 A1    Jun. 5, 2008

(30) Foreign Application Priority Data
Nov. 30, 2006  (JP)  .............................. 2006-323537

(51) Int. Cl.
*G06F 9/312* (2006.01)
(52) U.S. Cl. ..................................................... 712/220
(58) Field of Classification Search .................. 712/220; 711/145
See application file for complete search history.

(56) References Cited

U.S. PATENT DOCUMENTS

| | | | | |
|---|---|---|---|---|
| 5,440,750 | A * | 8/1995 | Kitai et al. ................... | 712/203 |
| 5,603,005 | A * | 2/1997 | Bauman et al. .............. | 711/124 |
| 6,115,803 | A | 9/2000 | Hayashi et al. | |
| 6,199,156 | B1 * | 3/2001 | Yoder et al. ................. | 712/228 |
| 2005/0021898 | A1 * | 1/2005 | Alverson et al. ............... | 711/1 |
| 2005/0044319 | A1 * | 2/2005 | Olukotun ..................... | 711/118 |
| 2006/0190702 | A1 * | 8/2006 | Harter et al. ................... | 712/15 |

OTHER PUBLICATIONS

Zhou, H., Dual-Core Execution: Building a Highly Scalable Single-Thread Instruction Window, 2005, IEEE, 12 pages.*
"The Alpha 21264 Microprocessor" Mar.-Apr. 1999, IEEE Micro, pp. 24-36.

* cited by examiner

*Primary Examiner*—Eric Coleman
(74) *Attorney, Agent, or Firm*—Stites & Harbison PLLC; Juan Carlos A. Marquez, Esq.

(57) ABSTRACT

The data processor executes an instruction having a direction for write to a reference register of other instruction flow and an instruction having a direction for reference register invalidation. The data processor is arranged as a data processor having typical functions as an integrated whole of processors (CPU1 and CPU2) which execute simple instruction flows. When executing the instruction having a direction for write to a reference register of other instruction flow, the processor confirms whether a write register is invalid. The processor waits for the register to be made invalid, if the register is not invalid, and performs write if the register is invalid. After having executed the instruction having a direction for reference register invalidation, the processor invalidates the register to which a reference has been made. When the reference register is invalid, execution of the referring instruction is suspended until it is made valid.

17 Claims, 12 Drawing Sheets

FIG.1

(1) C LANGUAGE PROGRAM

```
for(i=0;i<N;i++)
  c[i]=a[i]+b[i];
```

(2) ASSEMBLER PROGRAM

```
        mov  #_a,r0
        mov  #_b,r1
        mov  #_c,r2
        mov  #N,r3
_L00:   mov  @r0+,r4
        mov  @r1+,r5
        add  r4,r5
        mov  r5,@r2+
        dt   r3
        bf   _L00
```

FIG.2

| INSTRUCTION ISSUE QUEUE | | CYCLE | BRANCH PIPE | MEMORY PIPE | EXECUTION PIPE |
|---|---|---|---|---|---|
| 1 | mov @r0+,r4 | 1 | bf _L00 | mov @r0+,r4 | dt r3 |
| 2 | mov @r1+,r5 | 2 | | mov @r1+,r5 | |
| 3 | add r4,r5 | 3 | | | |
| 4 | mov r5,@r2+ | 4 | bf _L00 | mov @r0+,r4 | dt r3 |
| 5 | dt r3 | 5 | | mov @r1+,r5 | add r4,r5 |
| 6 | bf _L00 | 6 | | mov r5,@r2+ | |
| 7 | | 7 | bf _L00 | mov @r0+,r4 | dt r3 |
| 8 | | 8 | | mov @r1+,r5 | add r4,r5 |
| 9 | mov @r0+,r4 | 9 | | mov r5,@r2+ | |
| 10 | mov @r1+,r5 | 10 | bf _L00 | mov @r0+,r4 | dt r3 |
| 11 | add r4,r5 | 11 | | mov @r1+,r5 | add r4,r5 |
| 12 | mov r5,@r2+ | 12 | | mov r5,@r2+ | |
| 13 | dt r3 | 13 | bf _L00 | mov @r0+,r4 | dt r3 |
| 14 | bf _L00 | 14 | | mov @r1+,r5 | add r4,r5 |
| 15 | | 15 | | mov r5,@r2+ | |
| 16 | | | | | |

| CYCLE | BRANCH PIPE | MEMORY PIPE | EXECUTION PIPE |
|---|---|---|---|
| 1 | bf _L00 | mov @r0+,r4 | dt r3 |
| 2 | | mov @r1+,r5 | |
| 3 | | | |
| 4 | bf _L00 | mov @r0+,r4 | dt r3 |
| 5 | | mov @r1+,r5 | |
| 6 | | | |
| 7 | bf _L00 | mov @r0+,r4 | dt r3 |
| 8 | | mov @r1+,r5 | |
| 9 | | | |
| 10 | bf _L00 | mov @r0+,r4 | dt r3 |
| 11 | | mov @r1+,r5 | |
| 12 | | | add r4,r5 |
| 13 | bf _L00 | mov r5,@r2+ | dt r3 |

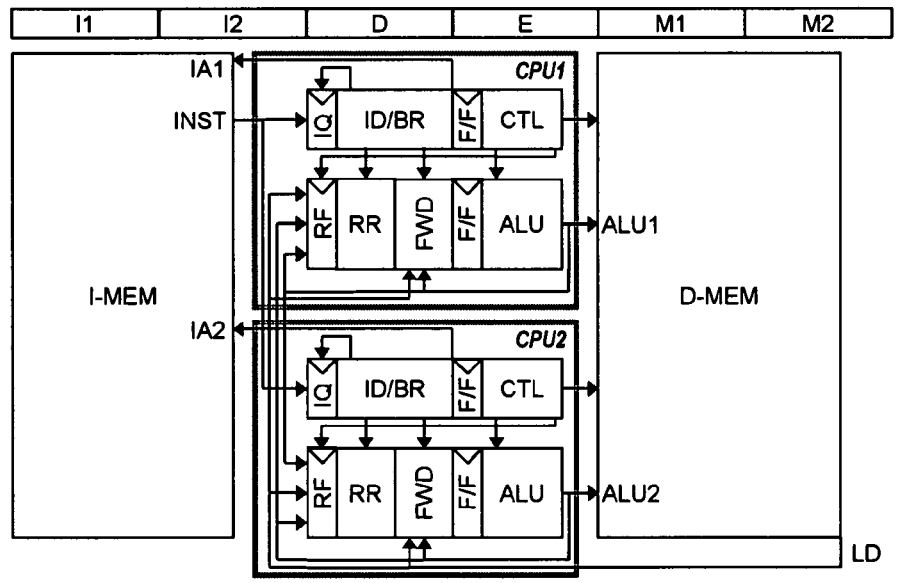

FIG. 7

| FIRST INSTRUCTION FLOW | | r0 | r1 | ... | r3 | ... | T | SECOND INSTRUCTION FLOW | | ... | r2 | r3 | r4 | r5 | ... | T |
|---|---|---|---|---|---|---|---|---|---|---|---|---|---|---|---|---|
| 1 | mov #_a,r0 | 1 | 0 | | 0 | | 0 | mov #_c,r2 | | | 1 | 0 | 0 | 0 | | 0 |
| 2 | mov #_b,r1 | 1 | 1 | | 0 | | 0 | mov #N,r3 | | | 1 | 1 | 0 | 0 | | 0 |
| 3 | mov #N,r3 | 1 | 1 | | 1 | | 0 | | | | 1 | 1 | 0 | 0 | | 0 |
| 4 | mov @r0+,r4/2 | 1 | 1 | | 1 | | 0 | | | | 1 | 1 | 0 | 0 | | 0 |
| 5 | mov @r1+,r5/2 | 1 | 1 | | 1 | | 0 | | | | 1 | 1 | 0 | 0 | | 0 |
| 6 | dt r3 | 1 | 1 | | 1 | | 1 | | | | 1 | 1 | 1 | 0 | | 0 |
| 7 | bf _L10 | 1 | 1 | | 1 | | 0 | | | | 1 | 1 | 1 | 1 | | 0 |
| 8 | | 1 | 1 | | 1 | | 0 | add r4,r5 | | | 1 | 1 | 0 | 1 | | 0 |
| 9 | | 1 | 1 | | 1 | | 0 | mov r5,@r2+ | | | 1 | 1 | 0 | 0 | | 0 |
| 10 | mov @r0+,r4/2 | 1 | 1 | | 1 | | 0 | dt r3 | | | 1 | 1 | 0 | 0 | | 1 |
| 11 | mov @r1+,r5/2 | 1 | 1 | | 1 | | 0 | bf _L20 | | | 1 | 1 | 0 | 0 | | 0 |
| 12 | dt r3 | 1 | 1 | | 1 | | 1 | | | | 1 | 1 | 1 | 0 | | 0 |
| 13 | bf _L10 | 1 | 1 | | 1 | | 0 | | | | 1 | 1 | 1 | 1 | | 0 |
| 14 | | 1 | 1 | | 1 | | 0 | add r4,r5 | | | 1 | 1 | 0 | 1 | | 0 |
| 15 | | 1 | 1 | | 1 | | 0 | mov r5,@r2+ | | | 1 | 1 | 0 | 0 | | 0 |
| 16 | mov @r0+,r4/2 | 1 | 1 | | 1 | | 0 | dt r3 | | | 1 | 1 | 0 | 0 | | 1 |
| 17 | mov @r1+,r5/2 | 1 | 1 | | 1 | | 0 | bf _L20 | | | 1 | 1 | 0 | 0 | | 0 |

| FIRST INSTRUCTION FLOW | SECOND INSTRUCTION FLOW |
|---|---|
| mov #_L10,start | mov #_L20,start |
| mov #_L11,end | mov #_L21,end |
| mov #N,loop | mov #N,loop |
| mov #_a,r0 | mov #_c,r2 |
| mov #_b,r1 | _L20: add r4,r5 |
| _L10: mov @r0+,r4/2 | _L21: mov r5,@r2+ |
| _L11: mov @r1+,r5/2 | |

FIG. 9

| FIRST INSTRUCTION FLOW | | r0 | r1 | ... | SECOND INSTRUCTION FLOW | | ... | r2 | ... | r4 | r5 | ... |
|---|---|---|---|---|---|---|---|---|---|---|---|---|
| 1 | mov #_a,r0 | 1 | 0 | | mov #_c,r2 | | | 1 | | 0 | 0 | |
| 2 | mov #_b,r1 | 1 | 1 | | | | | 1 | | 0 | 0 | |
| 3 | mov @r0+,r4/2 | 1 | 1 | | | | | 1 | | 0 | 0 | |
| 4 | mov @r1+,r5/2 | 1 | 1 | | | | | 1 | | 0 | 0 | |
| 5 | mov @r0+,r4/2 | 1 | 1 | | | | | 1 | | 1 | 0 | |
| 6 | mov @r1+,r5/2 | 1 | 1 | | | | | 1 | | 1 | 1 | |
| 7 | mov @r0+,r4/2 | 1 | 1 | | add r4,r5 | | | 1 | | 1 | 1 | |
| 8 | | 1 | 1 | | mov r5,@r2+ | | | 1 | | 1 | 1 | |
| 9 | mov @r1+,r5/2 | 1 | 1 | | add r4,r5 | | | 1 | | 1 | 1 | |
| 10 | | 1 | 1 | | mov r5,@r2+ | | | 1 | | 1 | 0 | |
| 11 | mov @r0+,r4/2 | 1 | 1 | | | | | 1 | | 1 | 1 | |
| 12 | mov @r1+,r5/2 | 1 | 1 | | add r4,r5 | | | 1 | | 0 | 1 | |
| 13 | | 1 | 1 | | mov r5,@r2+ | | | 1 | | 1 | 0 | |
| 14 | mov @r0+,r4/2 | 1 | 1 | | | | | 1 | | 1 | 1 | |
| 15 | mov @r1+,r5/2 | 1 | 1 | | add r4,r5 | | | 1 | | 0 | 1 | |
| 16 | | 1 | 1 | | mov r5,@r2+ | | | 1 | | 1 | 0 | |

.........   .........

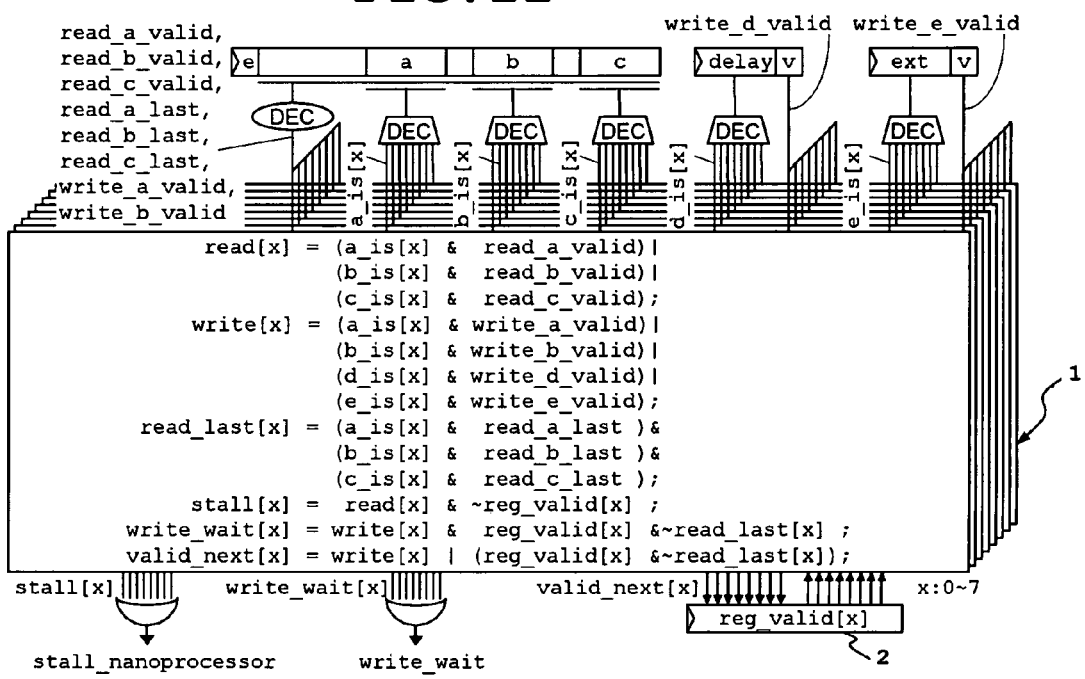

FIG. 14

(1) C LANGUAGE PROGRAM

```
for(i=0;i<N;i++){
  c[i]=a[i]+b[i];
  d[i]=a[i]-b[i];
}
```

(2) ASSEMBLER PROGRAM

INSTRUCTION FETCH
```
iqlp/ld _LD0,4,3,4,N
iqlp/ex _EX0,2,1,2,N
iqlp/st _ST0,4,3,4,N
```

LOAD
```
_LD0: mov #_a,r0
      mov #_b,r1
      mov @r0+,r0/ex
      mov @r1+,r1/ex
```

EXECUTION
```
_EX0: add r0/k,r1/k,r0/st
      sub r0   ,r1   ,r1/st
```

STORE
```
_ST0: mov #_c,r2
      mov #_d,r3
      mov r0,@r2+
      mov r1,@r3+
```

FIG. 15

INSTRUCTION FETCH FLOW
1  iqlp/ld _LD0,4,3,4,N
2  iqlp/ex _EX0,2,1,2,N
3  iqlp/st _ST0,4,3,4,N

| # | LOAD FLOW | r0 r1 | EXECUTION FLOW | r0 r1 | STORE FLOW | r0 r1 r2 r3 |
|---|---|---|---|---|---|---|
| 4 | LOAD FLOW | | EXECUTION FLOW | | STORE FLOW | |
| 5 | mov #_a,r0 | 1 0 | | 0 0 | | 0 0 0 0 |
| 6 | mov #_b,r1 | 1 1 | | 0 0 | | 0 0 0 0 |
| 7 | mov @r0+,r0/ex | 1 1 | | 0 0 | mov #_c,r2 | 0 0 1 0 |
| 8 | mov @r1+,r1/ex | 1 1 | | 0 0 | mov #_d,r3 | 0 0 1 1 |
| 9 | mov @r0+,r0/ex | 1 1 | | 1 0 | | 0 0 1 1 |
| 10 | mov @r1+,r1/ex | 1 1 | | 1 1 | | 0 0 1 1 |
| 11 | | 1 1 | add r0/k,r1/k,r0/st | 1 1 | | 0 0 1 1 |
| 12 | mov @r0+,r0/ex | 1 1 | sub r0 ,r1 ,r1/st | 1 0 | | 1 0 1 1 |
| 13 | | 1 1 | | 1 1 | mov r0,@r2+ | 0 1 1 1 |
| 14 | | 1 1 | add r0/k,r1/k,r0/st | 1 1 | mov r1,@r3+ | 0 0 1 1 |
| 15 | mov @r1+,r1/ex | 1 1 | sub r0 ,r1 ,r1/st | 1 0 | | 1 0 1 1 |
| 16 | | 1 1 | | 1 0 | mov r0,@r2+ | 0 1 1 1 |
| 17 | | 1 1 | | 1 1 | mov r1,@r3+ | 0 0 1 1 |
| 18 | mov @r0+,r0/ex | 1 1 | add r0/k,r1/k,r0/st | 1 1 | | 0 0 1 1 |
| 19 | mov @r1+,r1/ex | 1 1 | sub r0 ,r1 ,r1/st | 0 0 | | 1 0 1 1 |
| 20 | | 1 1 | | 1 0 | mov r0,@r2+ | 0 1 1 1 |
| 21 | | 1 1 | | 1 1 | mov r1,@r3+ | 0 0 1 1 |
| 22 | mov @r0+,r0/ex | 1 1 | add r0/k,r1/k,r0/st | 1 1 | | 0 0 1 1 |
| 23 | mov @r1+,r1/ex | 1 1 | sub r0 ,r1 ,r1/st | 0 0 | | 1 0 1 1 |
| 24 | | 1 1 | | 1 0 | mov r0,@r2+ | 0 1 1 1 |
| 25 | | 1 1 | | 1 1 | mov r1,@r3+ | 0 0 1 1 |

........ ........ ........

```
        INSTRUCTION FETCH                    LOAD STORE
    iqlp/ls _LS0,8,5,8,N            _LS0: mov #_a,r0
    iqlp/ex _EX0,2,1,2,N                  mov #_b,r1
                                          mov #_c,r2
                                          mov #_d,r3
           EXECUTION                      mov @r0+,r0/ex
   _EX0: add r0/k,r1/k,r4/ls             mov @r1+,r1/ex
         sub r0   ,r1   ,r5/ls           mov r4,@r2+
                                          mov r5,@r3+
```

FIG. 18
```
INSTRUCTION FETCH FLOW
1  iqlp/ld _LD0,8,5,8,N
2  iqlp/ex _EX0,2,1,2,N
3
4  LOAD STORE FLOW      r0 r1 r2 r3 r4 r5 ...    EXECUTION FLOW            r0 r1 ...
5  mov #_a,r0           1  0  0  0  0  0                                    0  0
6  mov #_b,r1           1  1  0  0  0  0                                    0  0
7  mov #_c,r2           1  1  1  0  0  0                                    0  0
8  mov #_d,r3           1  1  1  1  0  0                                    0  0
9  mov @r0+,r0/ex       1  1  1  1  0  0                                    0  0
10 mov @r1+,r1/ex       1  1  1  1  0  0                                    0  0
11 mov r4,@r2+          1  1  1  1  0  0                                    1  0
12 mov r5,@r3+          1  1  1  1  0  0                                    1  1
13 mov @r0+,r0/ex       1  1  1  1  1  0         add r0/k,r1/k,r4/st        1  1
14 mov @r1+,r1/ex       1  1  1  1  0  1         sub r0   ,r1   ,r5/st      0  0
15 mov r4,@r2+          1  1  1  0  0  0                                    1  0
16 mov r5,@r3+          1  1  1  1  0  0                                    1  1
17 mov @r0+,r0/ex       1  1  1  1  1  0         add r0/k,r1/k,r4/st        1  1
18 mov @r1+,r1/ex       1  1  1  1  0  1         sub r0   ,r1   ,r5/st      0  0
   .......                                       .......
```
FIG. 19
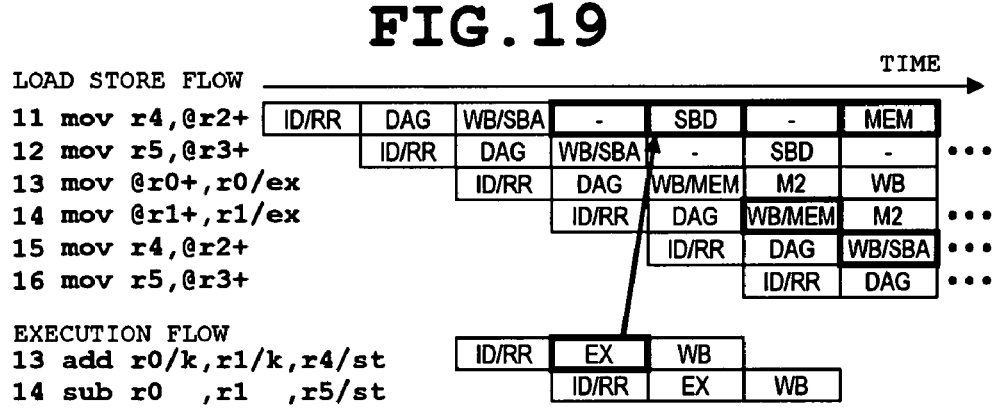
FIG. 20
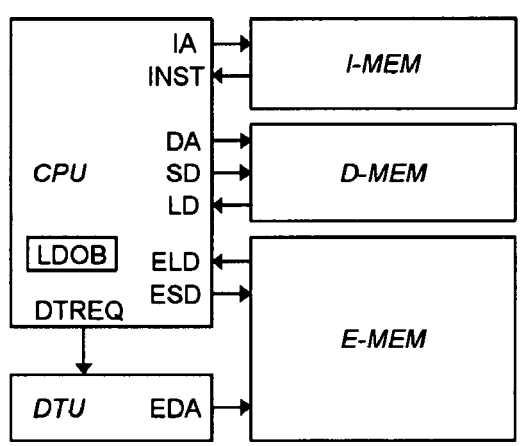

```
        mov #_ch1,r0
        mov #_a,r1
        mov r1,@r0/k
        mov #_ch1ctl,r1
        mov r1,@(r0,4)
        mov #_ch2,r0
        mov #_b,r1
        mov r1,@r0/k
        mov #_ch2ctl,r1
        mov r1,@(r0,4)
        mov #_c,r2
        mov #N,r3
_L10:   add r4,r5
        dt  r3
        mov r5,@r2+
        bf  _L10
```

| | FIRST INSTRUCTION | SECOND INSTRUCTION | r0 r1 r2 r3 r4 r5 ... |
|---|---|---|---|
| 1  | mov #_ch1,r0    | mov #_a,r1        | 1 1 0 0 0 0 |
| 2  | mov r1,@r0/k    | mov #_ch1ctl,r1   | 1 1 0 0 0 0 |
| 3  | mov r1,@(r0,4)  | mov #_ch2,r0      | 1 0 0 0 0 0 |
| 4  | mov #_b,r1      | mov r1,@r0/k      | 1 1 0 0 0 0 |
| 5  | mov #_ch2ctl,r1 | mov r1,@(r0,4)    | 0 1 0 0 0 0 |
| 6  | mov #_c,r2      | mov #N,r3         | 0 0 1 1 0 0 |
| 7  |                 |                   | 0 0 1 1 0 0 |
| 8  |                 |                   | 0 0 1 1 0 0 |
| 9  |                 |                   | 0 0 1 1 0 0 |
| 10 |                 |                   | 0 0 1 1 0 0 |
| 11 |                 |                   | 0 0 1 1 0 0 |
| 12 |                 |                   | 0 0 1 1 1 0 |
| 13 |                 |                   | 0 0 1 1 1 0 |
| 14 |                 |                   | 0 0 1 1 1 1 |
| 15 | add r4,r5       | dt  r3            | 0 0 1 1 1 1 |
| 16 | mov r5,@r2+     | bf  _L20          | 0 0 1 1 1 1 |
| 17 | add r4,r5       | dt  r3            | 0 0 1 1 1 1 |
| 18 | mov r5,@r2+     | bf  _L20          | 0 0 1 1 1 1 |
| 19 | add r4,r5       | dt  r3            | 0 0 1 1 1 1 |
| 20 | mov r5,@r2+     | bf  _L20          | 0 0 1 1 1 1 |

(10 cycles spans rows 5–14)

FIG.24

```
        mov  #_ch1,r0
        mov  #_a,r1
        mov  r1,@r0
        mov  #_ch1ctl,r1
        mov  r1,@(r0,4)
        mov  #_ch2,r0
        mov  #_b,r1
        mov  r1,@r0
        mov  #_ch2ctl,r1
        mov  r1,@(r0,4)
        mov  #_L10,start
        mov  #_c,r2
        mov  #_L11,end
        mov  #N,loop
_L10:   add  r4,r5
        regi r4
        mov  r5,@r2+
_L11:   regi r5
```

FIG.25

| | FIRST INSTRUCTION | SECOND INSTRUCTION | r4 r5 ... |
|---|---|---|---|
| 1 | mov #_ch1,r0 | mov #_a,r1 | 0 0 |
| 2 | mov r1,@r0 | mov #_ch1ctl,r1 | 0 0 |
| 3 | mov r1,@(r0,4) | mov #_ch2,r0 | 0 0 |
| 4 | mov #_b,r1 | mov r1,@r0 | 0 0 |
| 5 | mov #_ch2ctl,r1 | mov r1,@(r0,4) | 0 0 |
| 6 | mov #_L10,start | mov #_c,r2 | 0 0 |
| 7 | mov #_L11,end | mov #N,loop | 0 0 |
| 8 | | | 0 0 |
| 9 | | | 0 0 |
| 10 | | | 0 0 |
| 11 | | | 0 0 |
| 12 | | | 1 0 |
| 13 | | | 1 0 |
| 14 | | | 1 1 |
| 15 | add r4,r5 | regi r4 | 1 1 |
| 16 | mov r5,@r2+ | regi r5 | 1 1 |
| 17 | add r4,r5 | regi r4 | 1 1 |
| 18 | mov r5,@r2+ | regi r5 | 1 1 |
| 19 | add r4,r5 | regi r4 | 1 1 |
| 20 | mov r5,@r2+ | regi r5 | 1 1 |
| | ........ | ........ | |

10 cycles

FIG. 26

(1) C LANGUAGE PROGRAM

```
/* a="card"; */
/* b="car"; */
for(i=0;i<N;i++) {
  if(a[i]!=b[i]) break; /* mismatch */
  if(b[i]==0)    break; /* end of string */
}
c=a[i]-b[i]; /* character code difference */
```

(2) ASSEMBLER PROGRAM FOR THIRD EMBODIMENT

INSTRUCTION FETCH
```
iqlp/ls  _LS0,4,3,4,N
iqlp/ex  _EX0,6,2,3,N
bf/ex    _EX1,_EX3
bt/ex    _EX2,_EX3
```

LOAD STORE
```
_LS0: mov  #_a,r0
      mov  #_b,r1
      mov.b @r0+,r0/ex
      mov.b @r1+,r1/ex
```

EXECUTION
```
_EX0: mov   #0,r2
_EX1: cmp/eq r0,r1/k
_EX2: cmp/eq r1,r2/k
_EX3: regv  r0,r1
      sub   r0,r1
      regi  r2
```

(3) ASSEMBLER PROGRAM FOR FIFTH EMBODIMENT

```
      mov  #_ch1,r0
      mov  #_a,r1
      mov  r1,@r0
      mov  #_ch1ctl,r1
      mov  r1,@(r0,4)
      mov  #_ch2,r0
      mov  #_b,r1
      mov  r1,@r0
      mov  #_ch2ctl,r1
      mov  r1,@(r0,4)
      mov  #_L00,start
      mov  #0,r2
      mov  #_L01,end
      mov  #N,loop
_L00: cmp/eq r4,r5
      bf    _L03
      regi  r4
      cmp/eq r5,r2
      bt    _L02
_L01: regi  r5
_L02: regv  r4
_L03: sub   r4,r5
```

FIG. 27

INSTRUCTION FETCH FLOW · LOAD STORE FLOW

```
 1 iqlp/ls  _LS0,4,3,4,N
 2 iqlp/ex  _EX0,7,2,3,N
 3 bf/ex    _EX1,_EX3
 4 bt/ex    _EX2,_EX3
 5 mov  #_a,r0
 6 mov  #_b,r1
 7 mov  @r0+,r0/ex
 8 mov  @r1+,r1/ex
 9 mov  @r0+,r0/ex
10 mov  @r1+,r1/ex
11 mov  @r0+,r0/ex
12 mov  @r1+,r1/ex
13 mov  @r0+,r0/ex
14 mov  @r1+,r1/ex
15 mov  @r0+,r0/ex *
16 mov  @r1+,r1/ex *
17 mov  @r0+,r0/ex *
18 mov  @r1+,r1/ex *
19 mov  @r0+,r0/ex *
20
21
22
```

EXECUTION FLOW

```
mov    #0,r2 cmp/eq r0,r1/k
cmp/eq r1,r2/k
cmp/eq r0,r1/k
cmp/eq r1,r2/k
cmp/eq r0,r1/k
cmp/eq r1,r2/k
cmp/eq r0,r1/k
cmp/eq r1,r2/k *
cmp/eq r0,r1/k *
regv   r0,r1
sub    r0,r1
regi   r2
```

FIG.28

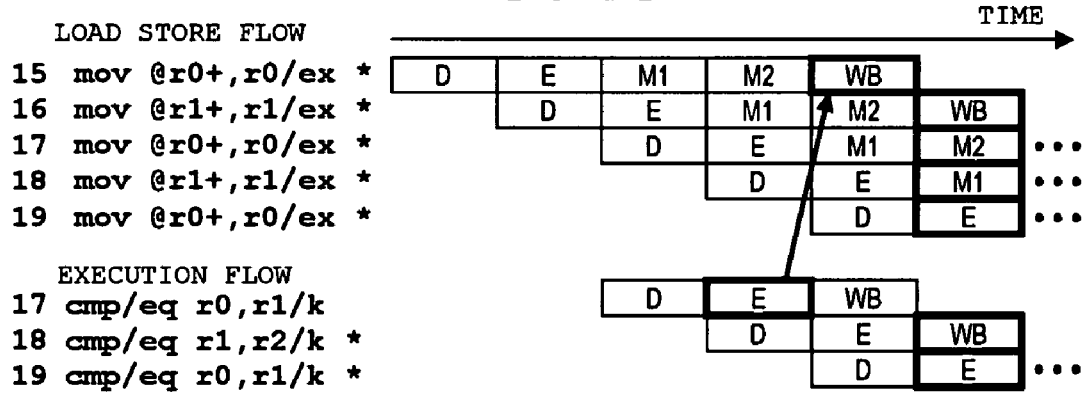

LOAD STORE FLOW
```
15  mov  @r0+,r0/ex  *
16  mov  @r1+,r1/ex  *
17  mov  @r0+,r0/ex  *
18  mov  @r1+,r1/ex  *
19  mov  @r0+,r0/ex  *
```

EXECUTION FLOW
```
17  cmp/eq  r0,r1/k
18  cmp/eq  r1,r2/k  *
19  cmp/eq  r0,r1/k  *
```

FIG.29

| | FIRST INSTRUCTION | SECOND INSTRUCTION | r4 | r5 |
|---|---|---|---|---|
| 1 | mov #_ch1,r0 | mov #_a,r1 | 0 | 0 |
| 2 | mov r1,@r0 | mov #_ch1ctl,r1 | 0 | 0 |
| 3 | mov r1,@(r0,4) | mov #_ch2,r0 | 0 | 0 |
| 4 | mov #_b,r1 | mov r1,@r0 | 0 | 0 |
| 5 | mov #_ch2ctl,r1 | mov r1,@(r0,4) | 0 | 0 |
| 6 | mov #_L00,start | mov #_c,r2 | 0 | 0 |
| 7 | mov #_L01,end | mov #N,loop | 1 | 0 |
| 8 | | | 1 | 0 |
| 9 | | | 1 | 1 |
| 10 | cmp/eq r4,r5 | bf _L03 | 1 | 1 |
| 11 | regi r4 | cmp/eq r5,r2 | 1 | 1 |
| 12 | bt _L02 | regi r5 | 1 | 1 |
| 13 | cmp/eq r4,r5 | bf _L03 | 1 | 1 |
| 14 | regi r4 | cmp/eq r5,r2 | 1 | 1 |
| 15 | bt _L02 | regi r5 | 1 | 1 |
| 16 | cmp/eq r4,r5 | bf _L03 | 1 | 1 |
| 17 | regi r4 | cmp/eq r5,r2 | 1 | 1 |
| 18 | bt _L02 | regi r5 | 1 | 1 |
| 19 | cmp/eq r4,r5 | bf _L03 | 1 | 1 |
| 20 | regi r4 * | cmp/eq r5,r2 * | 1 | 1 |
| 21 | bt _L02 * | regi r5 * | 1 | 1 |
| 22 | sub r4,r5 | | 1 | 1 |

DATA PROCESSOR

CLAIM OF PRIORITY

The Present application claims priority from Japanese application JP 2006-323537 filed on Nov. 30, 2006, the content of which is hereby incorporated by reference into this application.

FIELD OF THE INVENTION

The present invention relates to a data processor, and a technique which enables efficient information exchange between instruction flows.

BACKGROUND OF THE INVENTION

In recent years, the increase in performance of a single processor core has reached its limits. One of important options for continuous improvement of the performance has been to make a chip a multi-core chip materialized by integrating processor cores into one chip. However, a typical multi-core chip takes time to exchange data between processor cores, which makes an overhead. On this account, even a multi-core chip equipped with N cores cannot achieve N times the performance, provided that N is a natural number. Therefore, in regard to a typical multi-core chip, the performance per core deteriorates, leading to a decrease in its a real efficiency.

On the other hand, when the trend toward multi-core chips proceeds further, it becomes unnecessary that one processor core handles every task as in the past. When various processor cores are mounted on a chip and each core is made to perform processing which the core is good at, it becomes possible to increase its efficiency. When a chip to be used is a heterogeneous multi-core chip incorporating a legacy core and an engine core, the a real efficiency can be improved even if it is of a multi-core type. Here, a legacy core is one which maintains the compatibility with a conventional type general-purpose processor core and keeps the continuity of software, etc. An engine core is one which abandons the compatibility and is specialized in processing that the core is good at, whereby the efficiency is increased.

A single processor core has reached the limits in performance improvement. A factor of this is that it is tried to process a single program flow at a high speed. Even in the case where an original algorithm has parallelism, when the algorithm is described in the form of a single flow, its parallelism cannot be shown explicitly. Under a situation like this, when an attempt to draw the parallelism to an absolute maximum by means of hardware is made, a large number of hardware systems are required, which leads to reduction in efficiency. Further, even when a large area and a large volume of electric power are devoted until reaching their physical limits of mounting, the improvement of performance which offsets such efforts cannot be achieved.

For example, in the case of an out-of-order system, which is common as a system for a high end processor at present, a large-capacity buffer is used to hold a single instruction flow which uses a single program counter to manage an instruction address to be executed. Further, according to an out-of-order system, the following actions are performed: to check a data dependence; to execute instructions in the order in which collection of all the input data for instruction execution is completed; and to update the condition of a processor according to the order of the original instruction flow after instruction execution. In this case, a large-capacity register file is prepared in order to eliminate the limits of instruction produced by the antidependence of register operands and output dependency, and the registers are renamed. The result obtained by executing an instruction in advance can be used by the subsequent instruction earlier than the originally intended time, which contributes to improvement of the performance. However, update of the condition of a processor, which can be recognized from the outside when program execution is stopped halfway, cannot be made "out of order." This is because a basic processing of a processor, i.e. to stop a program temporarily and resume the program later, cannot be performed. Therefore, the result obtained by executing an instruction in advance is accumulated by a large-capacity reorder buffer, and then written back into e.g. a register file in the originally intended order. As described above, the out-of-order execution according to a single instruction flow is a method with a low efficiency, which requires a large-capacity buffer and complicated control. For example, in the case of the reference cited, R. E. Kessler, 'THE ALPHA 21264 MICROPROCESSOR,' IEEE Micro, vol. 19, no. 2, pp. 24-36, MARCH-APRIL 1999, as in FIG. 2 of page 25, twenty entries of integer issue queues, fifteen entries of floating-point issue queue, two sets of eighty integer register files, and seventy-two floating-point register files are prepared thereby to enable a large-scale out-of-order issue.

SUMMARY OF THE INVENTION

As described above, the large-scale out-of-order execution can improve the performance of a single flow. However, it reduces efficiencies of various kinds of processing such as register renaming, change of instruction execution order, and reordering, which are required because the large-scale out-of-order execution is based on a single flow. On the other hand, a multi-core chip allows two or more flows to be handled, however has a difficulty in efficient data exchange between instruction flows, whose efficiency lowers when a large-scale program is divided and made to run.

A conventional architecture based on a single instruction flow defines the data dependence by the order in which a program executes instructions. When the instruction execution order is followed strictly, all the data dependence is ensured. However, to do so, it is necessary to inhibit pipeline processing, super-scalar processing and out-of-order execution, deteriorating the performance extremely. Then, rules to maintain only the data dependence and change the instruction execution order have been established. Those are the following three rules.

Rule 1. Prior to execution of a certain instruction, all the data to which the certain instruction refers have been collected. In other words, all the write operations to registers and memories according to preceding instructions have been completed, provided that readout operations from the registers and memories are performed according to the certain instruction. (FLOW DEPENDENCY)

Rule 2. All the references to data which will be destroyed by update by a certain instruction have been completed. In other words, all the readout operations from the registers and memories according to preceding instructions have been completed, provided that write operations on the registers and memories are performed according to the certain instruction. (ANTIDEPENDENCE)

Rule 3. No preceding instruction overwrites data which has been updated according to a certain instruction. In other words, the order of update of registers and memories is maintained. (OUTPUT DEPENDENCE)

To keep three, it is necessary to decode all the preceding instructions before execution of a certain instruction. Consequently, in an out-of-order system processor, a large-capacity buffer is prepared to make an instruction decode to proceed ahead, whereby analyses of the three dependences are speeded up drastically to draw an instruction which can be executed in advance, as described above.

Also, in the case of transmitting data between processors, the data dependence is defined by the order in which a program executes instructions. Specifically, a synchronization point is provided in a program run by two or more processors, whereby a certain processor confirms that other processor has completed execution before a synchronization point and indirectly confirms that the data dependence is maintained even when an instruction after the synchronization point is executed. In this case, it is difficult to observe when other processor refers to and updates data having dependence actually. Therefore, it is difficult to perform out-of-order execution. Frequently setting synchronization points makes processing steps more sequential, which causes deterioration of performance together with the time required for synchronization synergistically.

As described above, it is difficult to execute data-dependent processing efficiently even with a single instruction flow or two or more instruction flows.

Hence, it is an object of the invention to provide a highly efficient high performance data processor which enables efficient data exchange between instruction flows, and in which various factors causing the decrease in efficiency which are produced owing to its architecture based on a single flow are removed by dividing a large-scale program into instruction flows and then executing the program.

It is another object of the invention to provide a high performance data processor which enables efficient data exchange between instruction flows and in which individual instruction flows are simplified and arranged so that each flow serves a single function.

Further, it is another object of the invention to provide a data processor which enables efficient data exchange between instruction flows, and in which an instruction flow for program structure definition is separated from an instruction flow for data processing, whereby enabling efficient supply of instructions.

The above and other objects of the invention and novel features hereof will be apparent from the descriptions hereof and the accompanying drawings.

The outlines of representative forms of a data processor according to the invention disclosed herein are as follows.

[1] A data processor in association with the invention executes an instruction having a direction for write to a reference register of other instruction flow, and an instruction having a direction for reference register invalidation.

The above-described data processor enables efficient data transfer to other instruction flow. In the data processor, when the instruction having a direction for write to a reference register of other instruction flow is executed, it is confirmed that a write register is invalid. The processor waits for the write register is made invalid if the write register is not invalid, and performs the write if it is invalid. On the other hand, after the instruction having a direction for reference register invalidation has been executed, the register to which a reference has been made is invalidated. Further, when the reference register is invalid, execution of the referring instruction is suspended until the register is made valid. As a result, the register is valid until the termination of the reference and as such, write from other flow is prevented, and checking of antidependence is performed correctly. Also, as the register is invalid until write from other flow is performed, execution of the referring instruction is suspended and thus checking of dependence is performed correctly.

[2] A data processor in association with the invention makes a processor having typical functions as an integrated whole of processors which execute a plurality of simple instruction flows. The simple instruction flow refers to an instruction flow which consists of only one selected from a load instruction, an execution instruction, and a store instruction, for example. A processor which executes a simple instruction flow shall be hereinafter referred to as "nanoprocessor." Specifically, a processor which executes only a load instruction is referred to as "a load nanoprocessor," a processor which executes only an execution instruction is referred to as "an execution nanoprocessor," and a processor which executes only a store instruction is referred to as "a store nanoprocessor."

According to the above-described arrangement, the nanoprocessors are simplified, whereby the efficiency is improved.

[3] A data processor in association with the invention has an instruction fetch nanoprocessor as a nanoprocessor. An instruction queue of a data processing nanoprocessor such as an execution nanoprocessor is regarded as a register handled by the instruction fetch nanoprocessor. The instruction fetch nanoprocessor executes an instruction having a direction for write to an entry of the instruction queue. The data processing nanoprocessor sends out a direction for invalidation after a reference to an entry of the instruction queue has been made, enabling instruction exchange.

According to the above-described arrangement, a program structure definition is incorporated in separate instruction flow, efficient instruction supply without using a complicated branch processing hardware system can be achieved by performing preceding instruction supply following the program structure during data processing.

BRIEF DESCRIPTION OF THE DRAWINGS

FIG. 1 is an explanatory view exemplifying a first program;

FIG. 2 is an explanatory view exemplifying an action of a loop part when the first program is run by a data processor of the out-of-order system;

FIG. 3 is an explanatory view exemplifying an action of a loop part when a load latency is ten;

FIG. 4 is an explanatory view exemplifying a pipeline structure of a data processor of a first embodiment;

FIG. 5 is an explanatory view exemplifying the first program assembled for the data processor of the first embodiment;

FIG. 6 is an explanatory view exemplifying instruction code formats for a data processor to which the invention is applied;

FIG. 7 is an explanatory view exemplifying an action of the program of FIG. 5 by the data processor of the first embodiment;

FIG. 8 is an explanatory view exemplifying the first program written using a loop structure definition instruction;

FIG. 9 is an explanatory view exemplifying an action of the program of FIG. 8 by the data processor of the first embodiment;

FIG. 10 is an explanatory view exemplifying an action of the program of FIG. 8 when the load latency is ten;

FIG. 11 is an explanatory view exemplifying a register validity judgment logic;

FIG. 14 is an explanatory view exemplifying a second program;

FIG. 15 is an explanatory view exemplifying an action of the second program by the data processor of the second embodiment;

FIG. 18 is an explanatory view exemplifying an action of the second program by the data processor of the third embodiment;

FIG. 19 is an explanatory view exemplifying avoidance of data-dependent stall by a store buffer;

FIG. 20 is an explanatory view exemplifying a block configuration of a data processor of the fourth embodiment;

FIG. 24 is a view showing an example of the first program assembled for the fifth embodiment;

FIG. 25 is an explanatory view exemplifying an action of the program of FIG. 24 by a data processor of the fifth embodiment when the load latency is ten;

FIG. 26 is an explanatory view exemplifying a character string comparison program;

FIG. 27 is an explanatory view exemplifying an action of the character string comparison program by the data processor of the third embodiment;

FIG. 28 is an explanatory view exemplifying load cancel by an execution nanoprocessor; and FIG. 29 is explanatory view exemplifying an action of the character string comparison program by the data processor of the fifth embodiment.

DETAILED DESCRIPTION OF THE PREFERRED EMBODIMENTS

Figure 12:
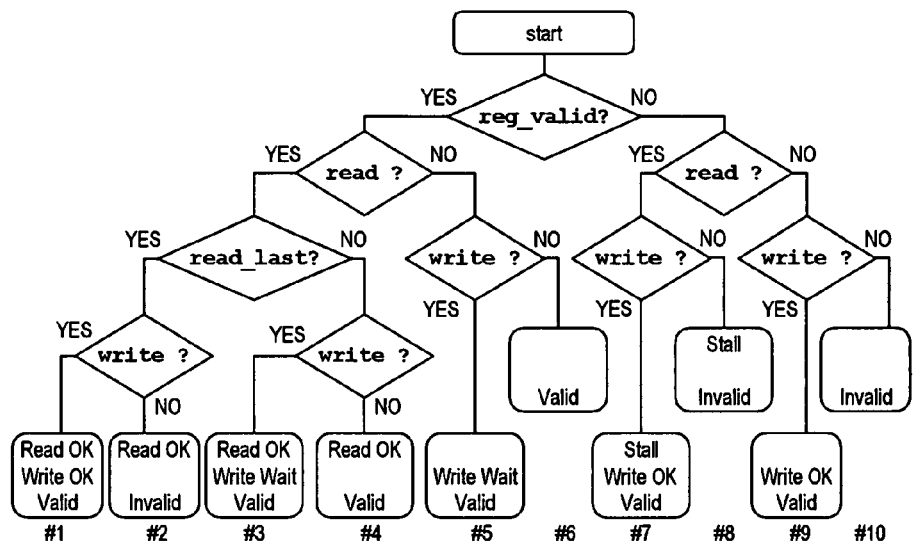
FIG. 12 is an explanatory view exemplifying an action flow of the register validity judgment logic.

1. Description of Outlines of the Embodiments

First the outline of the typical embodiments according to the invention disclosed herein will be described. In the descriptions of outlines on representative embodiments, a reference numeral or sign of a drawing, which is accompanied with paired round brackets only exemplifies what the concept of a component referred to by the numeral or sign contains.

[1] A data processor according to a representative embodiment of the invention has a plurality of data processing circuits executing different instruction flows respectively. Each of the data processing circuits has a plurality of registers which the instruction flows refer to, and a flag bit showing a validity with respect to data kept in the plurality of registers on an individual register basis. When executing a first instruction for directing an operation for writing data in the register of the other data processing circuit, the data processing circuit confirms whether or not the register targeted for the direction of the writing operation according to the first instruction is invalid, waits for the register to be made invalid if the register is not invalid, and performs the writing operation if the register is invalid. When executing a second instruction for providing a direction for invalidating data of the register referred to by use of the corresponding flag bit concurrently with the reference to the register, the data processing circuit suspends execution of the reference until the register is made valid if the register targeted for the direction of data invalidation by the second instruction is invalid. The data processing circuit performs control for invalidating the register to which a reference has been made after the second instruction has been executed.

According to the foregoing, when the plurality of data processing circuits each execute an instruction flow individually, write from other instruction flow on an operand having a dependence from one instruction flow to the other instruction flow is suspended because the register keeping the operand is valid until termination of the reference. As a result, check of antidependence is performed correctly. As the register referred to and invalidated is left invalid until write from other instruction flow is performed, execution of referring instruction is suspended, and therefore check of dependence is performed correctly.

One specific embodiment is as follows. The first and second instructions constitute an instruction set. The data processing circuit for executing a load instruction and an address generation instruction which are included in the instruction set is separated from the data processing circuit for executing a store instruction and the address generation instruction which are included in the instruction set. The configurations of data processing circuits each execute an instruction flow independently are simplified, which contributes to improvement of the data processing efficiency.

As another specific embodiment, the data processing circuit for executing a memory access instruction and the address generation instruction which are included in the instruction set is separated from the data processing circuit for executing other execution instruction. The configurations of data processing circuits each execute an instruction flow independently are simplified, which contributes to improvement of the data processing efficiency.

Also, as another specific embodiment, the data processor has: a data processing circuit for executing instruction fetch; and a data processing circuit for executing an arithmetic operation. In the data processor, an instruction queue of the data processing circuit for executing an arithmetic operation is regarded as a register handled by the data processing circuit for executing instruction fetch. A data processing device for executing instruction fetch executes, as the first instruction, an instruction having a direction for write to an entry of the instruction queue. A data processing device for executing an arithmetic operation executes, as the second instruction, an instruction for directing invalidation of the entry by use of a corresponding flag bit after the reference to the entry of the instruction queue, and performs instruction exchange from the data processing circuit for executing instruction fetch to the data processing circuit for executing an arithmetic operation.

Still another specific embodiment, the first instruction has a designation field of a first parameter for identifying the data processing circuit targeted for write corresponding to a destination register field. The first instruction can be materialized without increasing the kinds of opcodes. For example, the first instruction is a load instruction for transferring data from a memory designated with a register indirect addressing mode to a register.

As another specific embodiment, the second instruction has a designation field of a second parameter for directing whether to invalidate the register or not after reference corresponding to a register field. The second instruction can be materialized without increasing the kinds of opcodes. For example, the register field having the designation field of the second parameter is a field for designating a read register. The register field having a designation field of the second parameter does not include a field for designating a write register and fields for designating read and modify registers. No useless parameter designation field is attached on a register field which is assumed to be updated in an operation of the instruction.

[2] A data processor in association with an embodiment according to another aspect of the invention has a plurality of data processing circuits executing different instruction flows respectively. Each of the data processing circuits has a plurality of registers which the instruction flows refer to, and a flag bit showing a validity with respect to data kept in the plurality of registers on an individual register basis. An instruction set for the plurality of data processing circuits includes a first instruction for directing an operation for forcing one of the data processing circuits to write data in the register of the other data processing circuit, and a second instruction for providing a direction for data invalidation to a flag bit of the register targeted for the reference concurrently with the reference to the register of the data processing circuit.

For example, when executing the first instruction, the data processing circuit confirms whether or not the register targeted for the direction of the writing operation according to the first instruction is invalid, waits for the register to be made invalid if the register is not invalid, and performs write if the register is invalid. When executing the second instruction, the data processing circuit suspends execution of the referring instruction until the register is made valid if the register targeted for the direction of data invalidation by the second instruction has been invalid. The data processing circuit performs control for invalidating the register to which a reference has been made after the second instruction has been executed. Thus, efficient data transfer to other instruction flow enabled.

2. Detailed Description of the Embodiments

Now, the embodiments will be further described in detail.

Program Execution According to Single Instruction Flow

First, execution of a program according to a single instruction flow will be described as a comparative example with the embodiments in association with the invention before detailed descriptions of the embodiments. FIG. 1A exemplifies a first program in order to explain an example of an action which the program performs according to a single instruction flow. The first program is one which includes: adding two arrays a[i] and b[i], each having N elements; and storing a result of the addition in an array c[i] as described in C language. The explanation of the first program described with an assembler will be offered here. The assembler program assumes an architecture having post-increment type load and store instructions.

First, according to four immediate transfer instructions "mov #_a, r0", "mov #_b, r1", "mov #_c, r2" and "mov #N, r3", top addresses _a, _b and _c of three arrays and the number N of elements of each array are stored as initial settings in registers r0, r1, r2 and r3 respectively. Next, in a loop part, according to post-increment load instructions "mov @r0+, r4" and "mov @r1+, r5", array elements are loaded from addresses of the arrays a and b indicated by the registers r0 and r1 into the registers r4 and r5, and concurrently values of the registers r0 and r1 are incremented so as to indicate subsequent array elements. Then, according to an addition instruction "add r4, r5", the array elements loaded into the registers r4 and r5 are added, and the result is stored in the register r5. Subsequently, according to a post-increment store instruction "mov r5, @r2+", the value of the register r5, which is the result of addition of the array elements, is stored at an element address of the array c[i]. After that, according to a decrement & test instruction "dt r3", the number N of elements stored in the register r3 is decremented, and whether or not the result of the decrement is zero is tested. If the result is zero, a flag (T) for conditional branch is set, whereas if the result is not zero, the flag (T) is cleared. At the end, according to a conditional branch instruction "bf_LOO", the flag (T) is checked. If the flag (T) has been cleared, the data processor branches to the top of the loop that Label LOO indicates because the remaining number N of elements has not reached zero.

In reference to FIG. 2, the actions in the loop part when the first program runs on a data processor of the out-of-order system are exemplified, in which the actions from the first loop halfway through the fifth loop are described. Here, it is assumed that the load latency is three. When the distance between a load instruction and a load data use instruction is three or larger, it is possible to execute the load data use instruction. Also, the execute cycle of the branch instruction at the time of a branch prediction hit, i.e. the distance between the branch instruction and target instruction is assumed to be three. While according to the out-of-order system, a typical instruction needs a longer cycle until its issue, a branch instruction is arranged so as to be executed in as upstream a pipeline stage as possible to prevent instruction fetch from being delayed. Further, instruction fetch is performed in eight instructions, whereby a sufficient number of instructions can be buffered. In the example in FIG. 2, while the number of instructions in each loop is six and therefore two instructions subsequent to six instructions are also fetched, the two instructions are not executed and are cancelled until the processor goes out of the loop. On this account, a blank is left correspondingly.

Consequently, as in FIG. 2, in instruction issue slots of the first loop, there is an empty slot, while in the second loop an instruction is executed in every cycle in the memory pipe by execution order exchange of the out-of-order system with the addition instruction "add r4, r5" and the post-increment store instruction "mov r5, @r2+" of the first loop and the post-increment load instruction "mov @r0+, r4" and "mov @r1+, r5" of the third loop. Also, in regard to the loops starting with the third loop, an execution interval is shortened similarly, and thus instructions are executed at a high speed. During this time, the fourteenth branch instruction is executed prior to the third addition instruction in an instruction buffer. In this way, in order to shorten the execution interval, it is necessary that a judgment about whether or not to execute an instruction be made in each cycle with respect to many instructions thereby to select an adequate instruction. In addition, a conditional branch instruction "bf_LOO" should be executed normally after Flag as the result of the decrement & test instruction "dt r3" has been finally decided, however it can be executed in advance by branch prediction. Further, in order to execute the second post-increment load instructions "mov @r0+, r4" and "mov @r1+, r5" prior to the first addition instruction "add r4, r5", other physical registers different from those for the first time are allocated to the registers r4 and r5.

In reference to FIG. 3, actions in the loop part when the load latency is elongated to ten from three, which is a value assumed in the case of FIG. 2, are exemplified. It is realistic to assume an elongated latency because when large-scale data are handled, a high-speed memory with a small capacity cannot accommodate such data. On the other hand, as the program has a satisfactory locality, it may be expected that an instruction fetch can make a hit with respect to most high-speed memories with a small capacity. On this account, the execute cycle of the branch instruction is taken as to be three as in the case of FIG. 2. Incidentally, the six instructions in the first loop are colored in gray. Of the instructions, three instructions are executed in the first cycle, one instruction is executed in the second cycle, one instruction is executed in the twelfth cycle, and the remaining one is executed in the thirteenth cycle, as shown in the drawing. During intervals between executions of the instructions, a subsequent instruction is executed in advance according to practice of the out-of-order system, and in the thirteenth cycle the branch instruction "bf LOO" of the fifth loop is executed. In other words, the instructions of the first and fifth loops are executed concurrently. Therefore, it is required to hold forty instructions for five loops in instruction buffers. While execution order change targeting sixteen instructions for two loops is performed in the case of FIG. 2 where the load latency is three, the number of targeted instructions is increased significantly. As described above, to keep the performance in spite of an increase in latency, large-scale hardware is further scaled up in the case of the out-of-order system.

First Embodiment

In reference to FIG. 4, a pipeline structure of a data processor in association with the first embodiment of the invention is exemplified schematically. The data processor includes nanoprocessors CPU1 and CPU2, which are central processing units identical in structure, to handle two instruction flows. The nanoprocessors CPU1 and CPU2 make the different instruction flows run. One central processing function or data processor function is realized as an integrated whole of functions offered by the nanoprocessors.

The nanoprocessors CPU1 and CPU2 are typical in-order-issue type scalar processors in view of their basic structure. The pipeline is composed of two instruction fetch stages I1 and I2, a decode stage D, an execution stage E, and two memory access stages M1 and M2. The two nanoprocessors CPU1 and CPU2 are identical in arrangement, and therefore the arrangement will be described taking one processor CPU1 as a typical example. First, in the instruction fetch stages I1 and I2, an instruction INST is fetched from the instruction memory I-MEM and latched in an instruction queue IQ. Normal instruction fetch refers to consecutive address fetch in parallel with increment of an address. However, in the case where the address changes inconsecutively owing to e.g. a branch instruction, an instruction address IA1 from a branch processing unit BR is used to perform instruction fetch. A program counter keeping an address of an instruction to be executed is included in a circuit block of an instruction decoder ID in FIG. 4. Then, in the stage D, the instruction decoder ID and branch processing unit BR perform instruction decode and branch processing respectively, and a register read unit RR performs register read form a register file RF based on the resultant instruction decode information. The register file RF has a plurality of registers such as general purpose registers, which are used for execution of an instruction. Further, on an as-needed basis, a forwarding unit FWD performs forwarding of a result ALU1 of an arithmetic operation by an arithmetic operation unit ALU or load data LD from a data memory D-MEM. After that, in the stage E, the arithmetic operation unit performs an arithmetic operation, address calculation, etc., and in the stages M1 and M2 loading or storing of data is performed as required. Then, the result ALU1 of the arithmetic operation or load data LD is latched in the register file RF. In the data processor, e.g. the two nanoprocessors CPU1 and CPU2 have respective program counters, and share the instruction memory I-MEM and the data memory D-MEM.

In reference to FIG. 5, a program assembled for the data processor in association with the first embodiment of the invention is exemplified. The single instruction flow shown in FIG. 1 is divided in first and second instruction flows. In the first instruction flow, data is read out from the arrays a and b. In the second instruction flow, values thus read out are added and stored in the array c. As contrasted with the single instruction flow shown in FIG. 1, the first and second flows each contain the immediate transfer instruction "mov #N, r3", which is an instruction for prescribing a loop structure, and the decrement & test instruction "dt r3", and contain the conditional branch instructions "bf_L10" and "bf_L20" respectively; other instructions are distributed in the flows. In the nanoprocessors CPU1 and CPU2, a register valid bit rv is provided as a flag bit showing that data (i.e. a register operand) kept by a register in the register file RF is valid/invalid. In mutual reference to and update of a register operand between the nanoprocessors CPU1 and CPU2, the nanoprocessors CPU1 and CPU2 refer to the register valid bit rv in instruction decode. When the corresponding register valid bit rv designates that the data is valid, the nanoprocessors refer to a register operand, (if the data is invalid, the processors wait for the valid bit to be made valid) When the corresponding register valid bit rv denotes that the data is invalid, the nanoprocessors perform update of the register operand (if the data is valid, the processors wait for the valid bit to be made invalid).

A set of instructions that each of the nanoprocessors CPU1 and CPU2 includes an instruction having a keep parameter k used for control for mutual data reference between the processors and update of data, and a nanoprocessor number parameter np. For example, each register operand is made invalid by default after being referenced to, i.e. after being read out of a register, when k=0; writing is performed on a register involved in the same instruction flow (its own number is specified as the parameter np). In the case where the register operand is held valid even after readout, the instruction is accompanied with k=1. In the case where writing is performed on a register involved in other instruction flow, the number of the other nanoprocessor to be specified is taken as the parameter np. In the example shown in FIG. 5, as the same value is not used twice, there is no instruction accompanied with k=1. Now, it is noted that r3 of the decrement & test instruction "dt r3" and r5 of the addition instruction "add r4, r5" each refer to a modify register, and therefore there is no point in directing the register operands to be made invalid because the operands are made valid when new values are written to the registers. In other words, a direction for invalidation is significant only for a readout operand. Examples when writing is performed on a register involved in other instruction flow are two load instructions "mov @r0+, r4/2" and "mov @r1+, r5/2" of the first instruction flow. Here, /2 shows that writing is performed on a register involved in the second instruction flow.

In reference to FIG. 6, instruction code formats intended for a data processor that the invention is applied to are exemplified. As for the bit length of instruction words, there are mixed a length of 16 bits and a length of 32 bits. The instruction formats shown in FIG. 6 have a feature that they are defined so that an instruction having a direction of writing to a reference register involved in other instruction flow, and an instruction having a direction of invalidate the reference register can be encoded. In the drawing, e represents the presence or absence of an extension part ext of an instruction code; if e=1, the instruction code has an extension part ext. The sign op represents an opcode (Operation Code), and the sign im represents an immediate value embedded in an instruction code; op/im represents appropriate assignment to an opcode and an immediate value. The reference signs ra, rb and rc represent readout register number fields. The signs ma and mb are modify register number fields. The sign wa represents a write register number field. The sign k represents a keep field for directing invalidation of a readout register; the register is held valid if k=1, whereas the register is invalidated if k=0. The sign np represents a nanoprocessor number field, which is a field for specifying a nanoprocessor targeted for writing in connection with the register number field ma or wa. In the case shown in FIG. 6, the fields ma, mb and wa are used as a field for specifying a destination, and the fields ra, rb, ma and mb are used as a field used for specifying a source, and the field rc is used as a second source field in a three-operand-instruction format. In the drawings which will be referred to below in explaining a program and an action of the program, the values of the keep field k and nanoprocessor number field np are shown in the drawing of interest when the values are not default ones, and indication of the default values is omitted in the drawings.

In reference to FIG. 7, an action of the program shown in FIG. 5 which the data processor in association with the first embodiment of the invention conducts is exemplified. On the right side of each instruction is shown a value of the register valid bit rv which indicates a state of a register in use by the program on whether the register is valid or invalid. When the value is one, it is shown that the register has been valid, or the register is made valid newly. When the value is zero, it is shown that the register has been invalid, or the register is made invalid newly. In the case where the register is made valid or invalid newly, the value is surrounded by a frame drawn with a heavy solid line and highlighted in FIG. 7. Incidentally, in the case where the last readout from a register and new writing to the register are performed in the same cycle, the register is not in an invalid state in the whole cycle. Such action is taken in the cases where the register is a modify register of one cycle latency and where writing from another instruction flow is performed in a cycle the same as the one in which the last readout from the register has been performed. Further, to maintain a condition such that an instruction can be executed, it is necessary that a register targeted for readout be available before execution of the instruction.

In the first instruction flow, pointers to the two arrays and the number of loops are set up using the first three instructions. As a result, the registers r0, r1 and r3 are made valid sequentially. Next, two cycles of pipeline stalls are created owing to a branch after execution of the four instructions in the loop, and then the processor returns to the top of the loop. In the loop, two load instructions "mov @r0+, r4/2" and "mov @r1+, r5/2" are first executed. The instructions are executed with no stalls because the registers r0 and r1 are valid. The registers r0 and r1 are modified by post-increment so as to indicate a next array element, and made valid again. As the load latency is three, the registers r4 and r5 involved in the second instruction flow, which are load destination registers, are made valid in the third cycle after execution of the instruction. Next, the decrement & test instruction "dt r3" is executed. The instruction is executed without a stall because the register r3 is valid. After decrement, the register r3 is made valid again. Also, the T bit which is a flag showing the result of the decrement test is made valid. In the case where a loop which has not been made to run is left, and r3 is not made zero, the T bit becomes zero. At the end of the loop, the conditional branch instruction "bf_L10" is executed. Then, the branch holds because the T bit is zero, and the processor goes back to the top of the loop. From this time forward, the processing in the loop is repeated until the number of loops is decremented to reach zero.

On the other hand, in the second instruction flow, pointers to the arrays and the number of loops are set up using the first two instructions. The processor waits for the registers r4 and r5 to be made valid, provided that the registers r4 and r5 will be used by the addition instruction "add r4, r5" at the top of the loop. In the first instruction flow, loads to the registers r4 and r5 are started in the fourth and fifth cycles respectively, and each load takes three cycles. Hence, the registers r4 and r5 are made valid in sixth and seventh cycles. As a result, it becomes possible to execute the addition instruction "add r4, r5" in eighth cycle. Then, the register r4 is made invalid as a result of the last readout, and the resister r5 is made valid again when the result of the addition is written into the register r5. Subsequently, the result of the arithmetic operation is stored with the store instruction "mov r5, @r2+". This is carried out with no stall because the registers r2 and r5 are valid. Then, the register r5 is made invalid as a result of the last readout, and the register r2 is made valid again. At the end, as in the first instruction flow, the decrement & test instruction "dt r3" and conditional branch instruction "bf_L20" are executed, and then the processor goes back to the top of the loop after two cycles of stalls.

As stated above, in the second instruction flow, the processor can execute an instruction having a dependence on the first instruction flow with an adequate timing only by finding that writing to a register in the first instruction flow has made the register valid, which does not have to grasp the detail of the situation that the first instruction flow is made to run.

As in FIG. 2, an out-of-order processor which can issue three instructions in parallel and has a large-scale issue instruction queue can execute one loop for three cycles. In contrast, in the case shown in FIG. 7, each loop takes six cycles, which is rather efficient for its performance in view of the quantity of hardware. However, when its branch performance is improved, each loop can be executed for three cycles. For example, when a typical small loop structure definition instruction is used in DSP, the following actions are taken: to specify the top and end of each loop, and the number of loops; and to continue holding an instruction in the loop in an instruction queue; and to allow the processor to go out of the loop structure and proceed to a subsequent instruction after a specified number of loops have been made to run. In this case, the program of FIG. 5 is modified as shown in FIG. 8. The loop structure is defined by writing a loop start address, a loop termination address and the number of loops into three registers start, end, and loop. When the value of the number-of-loops register loop is decremented, whereby the value reaches zero, the processor goes out of the loop structure and proceeds to a subsequent instruction.

In reference to FIG. 9, an action of the program of FIG. 8 is shown. As a result of eliminating the need for a branch instruction, the performance depends on the bottleneck of load and store resources, and the processor executes one loop for three cycles in a steady state in the cycles starting with the fourth cycle. As a result, the performance equivalent to that of a large-scale, out-of-order type super-scalar processor is achieved by two simple in-order type scalar processors.

The instruction issue interval in FIG. 9 is made shorter in comparison to that in FIG. 7, and therefore the antidependence rule seems to be ignored. As described in reference to FIG. 2, in the case of a conventional out-of-order type processor, the antidependence is resolved by changing the allocation of physical registers. However, in the invention, in the case where writing to a register of a CPU in the middle of the operation of making other instruction flow run is performed, the processor waits for the register to be made invalid. Therefore, even when a write instruction is issued prematurely, no problem appears concerning the antidependence In the case shown in FIG. 9, as for the load to the register r4 in the fifth cycle of the first instruction flow, the processor waits for the last readout of the register r4 by the addition in the seventh cycle of the second instruction flow to make the register r4 invalid, and then performs the writing to the register r4. Likewise, as to the load to the register r5 in the sixth cycle of the first instruction flow, the processor waits for the last readout of the register r5 by store in the eighth cycle of the second instruction flow to invalidate the register r5 and then performs the writing to the register r5.

The action "to suspend execution of an instruction which has been started until a write register is invalidated because the write register is not invalid" is an action which a conventional data processor does not perform. However, a conventional data processor performs a similar action. For instance, in the case where a cache miss occurs during the time of cache store, store data is held, followed by pipeline stall, or writing the data to a store buffer and then waiting the writing to a cache while carrying processing of a subsequent instruction forward. After that, the writing of the store data waits until a cache entry is replaced. That is, the writing is performed after the replacement. Also, in the case of the invention, when pipeline stall is performed or a write data buffer is mounted, execution of an instruction can be made to wait until a pertinent write register is made invalid. Moreover, this can be materialized with a small-scale hardware because the need for processing such as forwarding of store data to load data as a store buffer requires when comparison with subsequent load in address matching is made and when such address matching occurs is eliminated.

In reference to FIG. 10, an action of the program of FIG. 8 when the load latency is ten is shown. Since the load latency is elongated, execution of the second instruction flow is delayed correspondingly. However, this never affects the first instruction flow, and the first instruction flow is made to run ahead. Hence, the load latency is encapsulated, and a throughput that one loop takes three cycles is maintained. The number of entries of write data buffers described above has to be increased correspondingly, with an increase in load instructions executed ahead. However, this can be materialized with a small-scale hardware for the number of entries as described above.

In reference to FIG. 11, an example of a register validity judgment logic 1 is shown. The judgment logic 1 is prepared for each register. When various instruction formats as shown in FIG. 6 are defined, the number of register operands differs depending on an instruction. Also, the register operands are different in their uses, each of which is intended for readout, writing or modification. Hence, the following signals are generated from an instruction code, and output to the judgment logic 1 of each register as shown in the drawing: signals read_a_valid, read_b_valid and read_c_valid showing that register fields a, b and c signify a readout register; and signals write_a_valid and write_b_valid showing that register fields a and b signify writing of one cycle latency to its own register. Register fields a(ra, ma, wa) and b(rb, mb) and c(rc) of the instruction code are decoded, and the results a_is [x], b_is[x] and c_is[x] of the decode are distributed to the judgment logic 1 of each register. Here, x represents a register number. According to the format shown in FIG. 6, the register field is composed of three bits, and therefore eight register files numbered 0 through 7 are set. Hence, x takes on 0 through 7. In parallel with this, decode of the keep field k is performed thereby to generate signals read_a_last, read_b_last and read_c_last signifying the last readout from the registers. The signals thus generated are output to the judgment logic 1 of each register.

It takes time to make a register valid when the latency is not one. Therefore, a write number is buffered for a time, and later supplied together with a valid signal. For instance, assuming that the latency is not one but three cycles, a write number is supplied after two cycles of buffering. In the case of FIG. 11, the buffered number stays in a latch delay, and the number is decoded. The result d_is[x] of the decode is sent to each judgment logic 1. In parallel with this, a write valid signal write_d_valid is sent to all the judgment logics 1. Also, as other nanoprocessor performs the writing, a write register number ext from the other nanoprocessor is also decoded. The result e_is[x] of the decode is sent to each judgment logic 1. In parallel with this, a valid signal write_e_valid of write from the other nanoprocessor is sent to all the judgment logics 1.

In the judgment logic 1 for each register, if readout occurs, then a signal Read[x] is generated, first; and if write occurs, then a signal write[x] is generated. Subsequently, the last readout is performed thereby to generate a signal read_last [x]. From these signals, a stall directive stall [x], a write-wait directive write_wait[x] and a next-cycle valid valid_next[x] are created and output. The stall directive stall [x] is activated when read is designated with respect to a corresponding register, and the pertinent register is invalid (~_reg_varld[x]). The write-wait directive write_wait[x] is activated when write is designated with respect to a corresponding register, the pertinent register is valid (reg_valid[x]), and the latest readout is not the last one (~read_last[x]). The next-cycle valid valid_next[x] is activated when write is designated with respect to a corresponding register, or the register is valid (reg_valid[x]) and the latest readout is not the last one (~read_last [x]). In FIG. 11, reg_valid [x] means the register valid bit rv of each register. The reference numeral 2 represents a valid bit flag register including register valid bits rv which correspond to eight registers of a nanoprocessor CP1 respectively.

After that, the logical OR is carried out on all of stall directive stall [x] output from the judgment logic 1 for each register thereby to generate a stall directive stall_nanoprocessor of the nanoprocessor. Likewise, the logical OR is performed on all of write-wait directive write_wait[x] output from the judgment logic 1 for each register thereby to generate a write-wait directive write_wait of the nanoprocessor. Further, the valid_next [x] output from the judgment logic 1 for each register is latched and made a register valid signal reg_valid[x]. In other words, in the case of readout with respect to a register, for which it is directed that k=0, the register valid bit rv of the register corresponding to valid_next is invalidated; in the case of readout with respect to a register, for which it is directed that k=1, the register valid bit rv of the register corresponding to valid_next is left valid; and in the case of writing, the register valid bit rv of the corresponding register is also made valid.

According to the logic as described above, the validities of the registers are managed adequately. This enables stall of judgment on whether it is possible or not for a nanoprocessor to execute each instruction, and synchronization of data exchange between nanoprocessors.

In reference to FIG. 12, the flow of actions the register validity judgment logic 1 is shown. According to the validity judgment logic, judgment is made on: whether register read is possible (Read OK); whether stall is required (stall); whether write is possible (Write OK); whether writing is made to wait (Write Wait); and whether the register is made valid (Valid) or invalid (Invalid). For such judgments, the following texts (statements) are used: Is Register valid? (reg_valid?); Does readout occur? (Read?); Last readout? (read_last?); and Does write occur? (Write?).

First, since register read is possible (Read OK) when a pertinent register is valid and readout occurs, in four cases #1 to #4 starting with the leftmost one register read is made possible (Read OK). In contrast, when a pertinent register is invalid and readout occurs, stall is required (stall) Therefore, stall is required (stall) in the cases #7 and #8. As for whether stall is required, stall is unnecessary in the cases except the cases #7 and #8. In regard to the cases marked with an odd number, in which register write occurs, write is possible (Write OK) in the cases #1, #7, and #9; write is forced to wait in the cases #3 and #5. Of the cases, in the case #1 the last readout has been finished. In the cases #7 and #9, the pertinent register is invalid originally. In the case #3, the pertinent register is valid, and the latest readout is not last one. In the case #5, readout does not occur and the pertinent register remains valid. Further, in the cases #2, #8 and #10, the pertinent register is invalidated (i.e. made Invalid). Of such cases, in the case #2 the last readout has been performed and write does not occur. In the cases #8 and #10, the register remains invalid and write does not occur. As to the rest, in the cases #1, #7 and #9, additional write makes the register valid (Valid); in the cases #3 to #6, the register remains valid (Valid) as it is because it is left holding a valid value.

Second Embodiment

Figure 13:
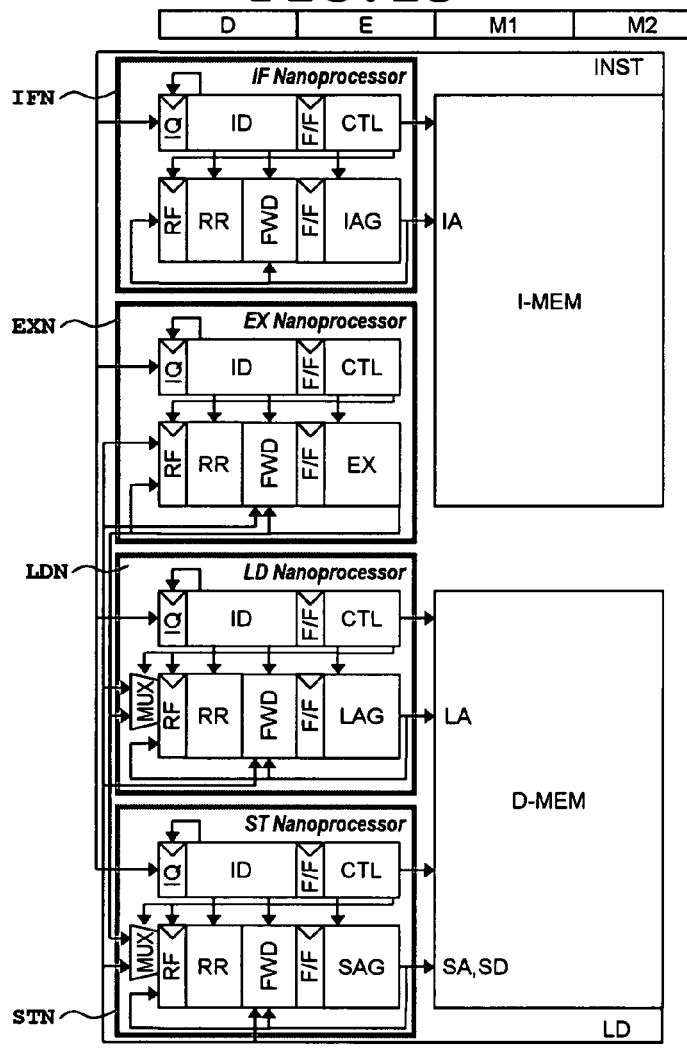
FIG. 13 is an explanatory view exemplifying a pipeline structure of a data processor of the second embodiment.

In reference to FIG. 13, a data processor in association with the second embodiment of the invention is exemplified. In the second embodiment, each nanoprocessor is arranged to have a single function. The data processor includes: an instruction fetch nanoprocessor (IF Nanoprocessor) IFN; an execution nanoprocessor (EX Nanoprocessor) EXN; a load nanoprocessor (LD Nanoprocessor) LDN; a store nanoprocessor (ST Nanoprocessor) STN; an instruction memory (I-MEM); and a data memory (D-MEM).

The pipeline of each nanoprocessor has a form as obtained by simplification of a typical processor pipeline. The nanoprocessors are similar in basic arrangement, which is composed of a decode stage D, an execution stage E, and two memory access stages M1 and M2.

The instruction fetch nanoprocessor IFN will be described first. In the stage D, an instruction in an instruction queue IQ is subjected to instruction decode by an instruction decoder ID, and a register read unit RR performs register read from a register file RF based on the resultant instruction decode information. Further, on an as-needed basis, a forwarding unit FWD performs forwarding of an output IA of an instruction address generation unit IAG. Thereafter, the instruction address generation unit IAG in the stage E generates an instruction address IA. In the stages M1 and M2, instruction fetch is performed. Then, the fetched instruction INST is latched in the instruction queue IQ of some one of the four nanoprocessors. The instruction queue IQ in which the fetched instruction INST is latched is designated in an instruction that the instruction fetch nanoprocessor will carry out. The kind of instructions will be described later.

Next, the execution nanoprocessor EXN will be described. In the stage D, an instruction in an instruction queue IQ is subjected to instruction decode by an instruction decoder ID, and a register read unit RR performs register read from a register file RF based on the resultant instruction decode information. Further, on an as-needed basis, a forwarding unit FWD performs forwarding of an output EX0 of an execution unit EX or load data LD from a data memory D-MEM. Thereafter, the execution unit EX in the stage E performs an arithmetic operation. The output EX0 of the execution unit EX is stored in the register file RF. The register file in which the output EX0 is stored is designated in an instruction that the execution nanoprocessor EXN will carry out. When the write is performed on a register of other nanoprocessor, the following are made possible: to perform a complicated address calculation and then transmit a result of the calculation to the load nanoprocessor LDN or store nanoprocessor STN; and to transmit a result of an operation to the store nanoprocessor STN for the purpose of storing the result.

Next, the load nanoprocessor LDN will be described. In the stage D, an instruction in an instruction queue IQ is subjected to instruction decode by an instruction decoder ID, and a register read unit RR performs register read from a register file RF based on the resultant instruction decode information. Further, on an as-needed basis, a forwarding unit FWD performs forwarding of an output LA of a load address generation unit LAG or load data LD from a data memory D-MEM. Thereafter, the load address generation unit LAG in the stage E generates a load address LA. In the stages M1 and M2, load from the data memory D-MEM is performed. The load data LD is stored in the register file RF. The register file RF in which the load data is stored is designated in an instruction that the load nanoprocessor LDN will carry out. Typically, the data is transmitted to the execution nanoprocessor EXN, and then an operation is performed. However, if the action is data transfer between memories, the data is transmitted to the store nanoprocessor STN. Further, in the case where the action follows data link, the data is stored in the register file RF of the load nanoprocessor LDN. In the case of updating an address register, the output LA of the load address generation unit LAG is stored in the register file RF.

Next, the store nanoprocessor STN will be described. In the stage D, an instruction in an instruction queue IQ is subjected to instruction decode by an instruction decoder ID, and a register read unit RR performs register read from a register file RF based on the resultant instruction decode information. Further, on an as-needed basis, a forwarding unit FWD performs forwarding of an output SA of store address generation unit SAG or load data from a data memory D-MEM. Thereafter, the store address generation unit SAG in the stage E generates a store address SA. In the stages M1 and M2, store data SD is stored in the data memory D-MEM. In the case of updating an address register, the output SA of the store address generation unit SAG is stored in the register file RF.

In reference to FIG. 14, a second program assembled for the data processor in association with the second embodiment of the invention is exemplified. The program shown in FIG. 1 never uses data two or more times. Therefore, of holding and invalidation of readout data, which are features of the invention, an example of the holding is not presented. Then, a second program different from the first program shown in FIG. 1 is used. The portion of FIG. 14 marked with (1) shows a program described in C language. The second program determines the sum of and difference between elements of two arrays a and b, and stores the sum and difference in different arrays c and d respectively. The portion of FIG. 14 marked with (2) shows assembler codes for the processor in association with the second embodiment exemplified in FIG. 13. The assembler codes are divided in four flows for the four nanoprocessors.

In the instruction fetch flow, load of codes for the three remaining data processing flows to the individual instruction queues IQ is performed. First, the instruction queue load & loop setting instruction "iqlp/ld_LD0, 4, 3, 4, N" is an instruction which includes loading four instructions from a label _LD0 to the instruction queue IQ of the load nanoprocessor LDN and making setting so that the third to fourth instructions are made to loop N times. As there are many operands, each instruction is made up of thirty two bits. Each instruction uses twenty three bits for the operands when the following conditions are all satisfied: a label address is indicated with an offset of eight bits from the program counter; the number of loaded instructions, a loop start instruction and a loop termination instruction are each expressed with three bits; and the number of loops is expressed with six bits. In the case where it is desired to increase the number of bits, an instruction may be divided into a portion for instruction queue load and a portion for loop setting. In the example of FIG. 14, it is possible to pack the operations in an instruction. Of the instruction formats shown in FIG. 6, the first format with no register operand may be used. When e of the top bits is made one, an instruction of thirty two bits can be obtained. Likewise, the instruction "iqlp/ex_EX0, 2, 1, 2, N" is an instruction which includes loading two instructions from the label _EX0 to the instruction queue IQ of the execution nanoprocessor EXN and making setting so that the first and second instructions are made to loop N times. The instruction "iqlp/st_ST0, 4, 3, 4, N" is an instruction which includes loading four instructions from the label _ST0 to the instruction queue IQ of the store nanoprocessor STN, and making setting so that third and fourth instructions are made to loop N times.

In the load flow, the top addresses of the arrays a and b are set to r0 and r1 before the loop. In the loop, elements of the arrays a and b are sequentially loaded in ascending order of addresses according to the instructions "mov @r0+, r0/*ex*" and "mov @r1+, r1/*ex*". Here, r0 and r1 for an address represent registers of the load nanoprocessor LDN, which are incremented after load. r0/*ex* and r1/*ex* represent registers of the execution nanoprocessor EXN. To perform an operation on load data, the destination of the load instruction is set to the register of the execution nanoprocessor EXN. The load instructions use the eighth format of the instruction formats shown in FIG. 6. The registers r0 and r1 for an address are allocated the field mb. For the registers r0/*ex* and r1/*ex* as destinations, the field wa is used. The field np is used to designate that they are registers of the execution nanoprocessor.

In the execution flow, subtraction and addition are performed on the two loaded values according to the addition instruction "add r0/*k*, r1/*k*, r0/*st*" and the subtraction instruction "sub r0, r1, r1/*st*" respectively. As in these operations the registers r0 and r1 are each referred to twice, /k is accompanied for reference according to the first addition thereby to hold the values. After the reference according to the second subtraction, the registers are invalidated. The r0/*st* and r1/*st* are registers of the store nanoprocessor STN. The results of the operations are sent to the store nanoprocessor STN and stored therein. Of the instruction formats shown in FIG. 6, the ninth format is used for the addition and subtraction instructions. According to the format, the values can be held by accompanying a readout operand with /k appropriately. The r0/*st* in the addition instruction and r1/*st* in the subtraction instruction are allocated to the field wa, and the field np is used to designate the store nanoprocessor STN.

In the store flow, the top addresses of the arrays c and d are set to r2 and r3 before the loop. In the loop, data sent from the execution nanoprocessor EXN are sequentially stored in elements of the arrays c and d according to the store instructions "mov r0, @r2+" and "mov r1, @r3+". Of the instruction formats shown in FIG. 6, the sixth format is used for the store instructions. The store data is allocated to the rb field, and an address subjected to post-increment is allocated to the field ma.

In reference to FIG. 15, an action of the program shown in FIG. 13 which the data processor in association with the second embodiment conducts is shown. First, the three instructions of the instruction fetch flow are executed, instructions to execute load, execution and store flows are set up in the instruction queues IQ of the load, execution and store nanoprocessors LDN, EXN and STN shown in FIG. 13. More specifically, when the instruction queue load & loop setting instruction "iqlp/ld_LD0, 4, 3, 4, N" is written into the instruction queue IQ of the instruction fetch nanoprocessor IFN, the instruction is decoded by the instruction decoder ID, and control information for generation of the top address of the load flow indicated by _LD0 is set up. Then, the instruction address generation unit IAG generates an instruction address IA. Further, the instruction memory I-MEM is accessed, and the four instructions of the load flow are fetched and written into the instruction queue IQ of the load nanoprocessor LDN. Moreover, the control setting is made so that the third and fourth instructions are repeated N times according to the specified loop structure. As a result, four cycles are taken until the write to the instruction queue IQ of the load nanoprocessor LDN since the write to the instruction queue IQ of the instruction fetch nanoprocessor IFN because the data processor goes through the stages D, E, M1 and M2 of the instruction fetch nanoprocessor IFN. Therefore, the load nanoprocessor LDN starts execution from the fifth cycle as shown in FIG. 15. When instructions in the execution and store flows are set up likewise, they can be executed form sixth and seventh cycles.

In the load flow, pointers to the two arrays a and b, from which data are loaded, are set up using the first two instructions. As a result, the registers r0 and r1 are made valid sequentially. After that, the data processor goes into the loop action, and executes the two load instructions "mov @r0+, r0/*ex*" and "mov @r1+, r1/*ex*" alternately. The reason why there is an empty slot in the eleventh cycle is as follows. That is, the load instruction "mov @r0+, r0/*ex*" in the ninth cycle is made to wait for write to the register r0/*ex* because the value of the resister r0 is held according to the addition instruction "add r0/*k*, r1/*k*, r0/*st*" in the execution flow in this cycle, and therefore the subsequent instruction is stalled in order to realize instruction execution with the fewest possible write data buffers. As for the instruction "mov @r1+, r1/*ex*" in the tenth cycle, it is too late to stall it because the instruction has been already issued, and therefore the write is made to wait with the write data buffer. In regard to the instructions starting with the thirteen cycle, memory access is performed in the store flow, which causes a contention. As a result, the load can be kept from proceeding ahead excessively, and thus it is avoided that write of load data is made to wait. Hence, the stalls in and after the thirteen cycle are caused by a contention of memory access with the store flow.

In the execution flow, it becomes possible to execute an instruction from the sixth cycle as stated above. The top addition instruction "add r0/*k*, r1/*k*, r0/*st*" is made to wait for the registers r0 and r1 to be made valid. As the registers r0 and r1 are made valid in tenth cycle, the data processor starts executing the instruction in eleventh cycle. The values of the registers r0 and r1 are held in the eleventh cycle. When the subtraction instruction "sub r0, r1, r1/*st*" is executed in the twelfth cycle, the registers r0 and r1 are invalidated. When the load data, write of which has been made to wait, is written into the registers in the twelfth and thirteenth cycles, the registers r0 and r1 are made valid again. The destinations of the addition and subtraction instructions are the registers r0 and r1 of the store nanoprocessor STN, and therefore the data is written into the register file RF of the store nanoprocessor STN without using a forwarding path. On this account, the latencies of the addition and subtraction instructions appear to be two cycles from the standpoint of the store nanoprocessor STN. Also, thereafter the addition and subtraction instructions are repeated, and the addition and subtraction instructions are executed each time write from the load flow makes the registers r0 and r1 valid under the loop control.

In the store flow, it becomes possible to execute an instruction from the seventh cycle as stated above. Therefore, pointers to the top addresses of the arrays c and d, into which data are stored, are set up using the first two instructions. As a result, the registers r2 and 3 are made valid sequentially. After that, the data processor goes into the loop action, and executes the two store instructions "mov r0, @r2+" and "mov r1, @r3+" alternately. First, as write from the execution flow makes the register r0 of store data valid in the twelfth cycle, the instruction "mov r0, @r2+" is executed in the thirteen cycle. Then, the value of the register r0 is stored at an address indicated by the register r2 thereby to invalidate the register r0 and increment the register r2. Likewise, as the register r1 of store data is made valid in the thirteen cycle, the instruction "mov r1, @r3+" is executed in the fourteenth cycle. After that, in the same way the store instructions are executed each time the registers r0 and r1 are made valid, whereby the registers r0 and r1 are invalidated, and the registers r2 and r3 are updated.

As described above, the four nanoprocessors IFN, EXN, LDN and STN can cooperate to run the program efficiently. Further, as described concerning the case of the first embodiment in reference to FIG. 10, the method according to the invention can cope with an increase in the latency efficiently. Also, in the case of the second embodiment, it is possible to cope with an increase in the latency, and the starts of the execution in FIG. 15 and store flows are just delayed according to an increase in the latency. In this case, the number of instructions which have been issued and cannot be stalled and which are made to wait for write like the above-described loads in the ninth and tenth cycles is increased in proportion to the latency. Therefore, it is needed to appropriately increase the number of entries of write buffers for such instructions.

Third Embodiment

Figures 16, 17:
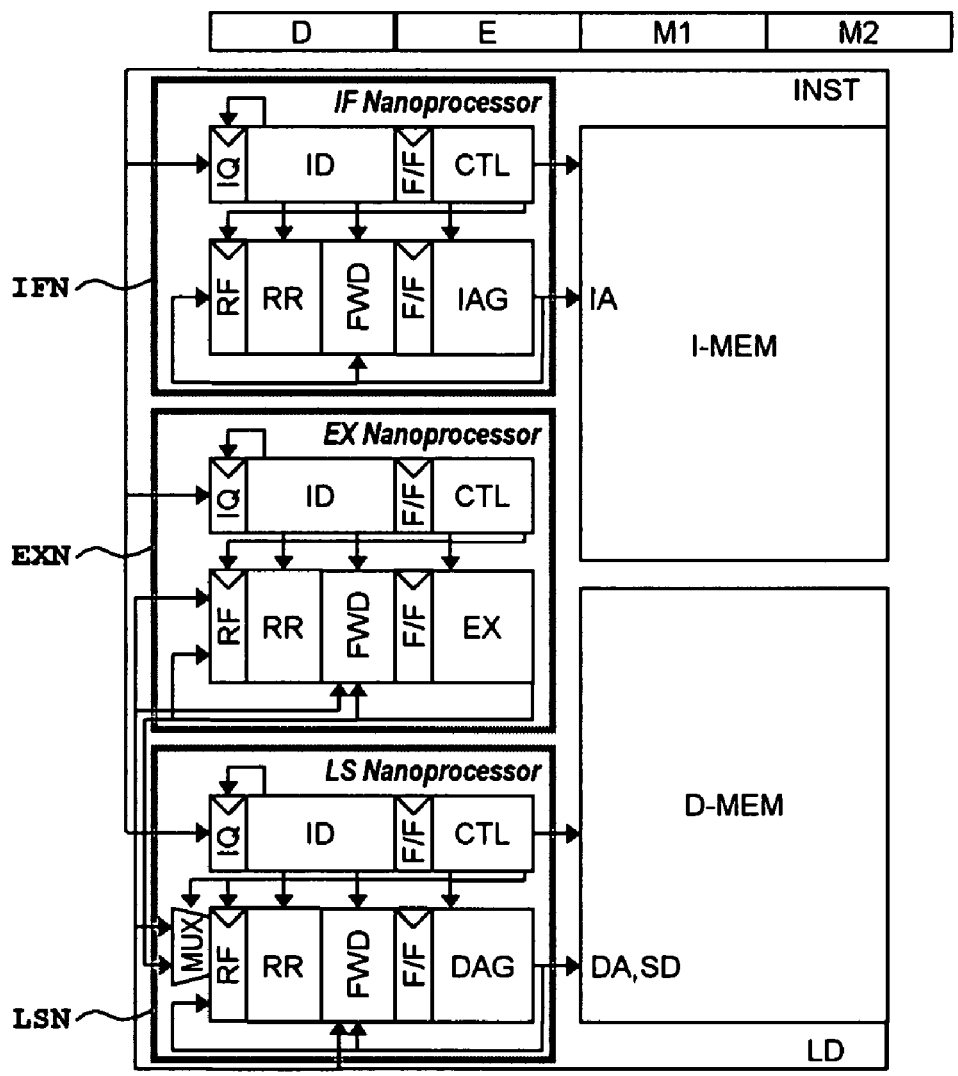
FIG. 16 is an explanatory view exemplifying a pipeline structure of a data processor of the third embodiment.
FIG. 17 is a view showing an example of the second program assembled for the third embodiment.

In reference to FIG. 16, a data processor in association with the third embodiment of the invention is exemplified. In the third embodiment, of the nanoprocessors according to the second embodiment, the load nanoprocessor LDN and store nanoprocessor STN are integrated into a load store nanoprocessor (LS Nanoprocessor) LSN. It is conducive to improving the performance of a data processor that a data processor is functionally divided as personified according to the second embodiment so that the resulting functional blocks are staggered in timings. This is because load to be executed prior to the operation, and store are different in optimum execution timing basically. Here, it is noted that the load is an action of supplying a source operand for an operation from a memory, and the sore refers to an action of storing the result of an operation after the operation. However, for the purpose of facilitating analysis of mutual dependence of memory access, it is desirable to carry out memory access sequentially. Particularly, it is important that processing of an address is performed sequentially. Hence, in the third embodiment, analysis of mutual dependence of memory access is facilitated, while store processing can be delayed substantially, which is achieved by making the following arrangements: the load store nanoprocessor LSN executes access to memories sequentially; and it is made possible by use of a store buffer to delay the receipt of store data in store processing.

Of the nanoprocessors, the instruction fetch nanoprocessor IFN and execution nanoprocessor EXN are similar to those in the second embodiment. The third embodiment differs from the second embodiment in the following two points. The first is that the number of destinations targeted for instruction supply by the instruction fetch nanoprocessor IFN is changed from four to three. The second is that destinations to which the execution nanoprocessor EXN transmits data are changed to only the load store nanoprocessor LSN from the load and store nanoprocessors LDN and STN. The load store nanoprocessor LSN is structurally identical with the store nanoprocessor STN according to the second embodiment. The load store nanoprocessor differs from the store nanoprocessor in that a request for load as well as a request for store are made to the data memory D-MEM. Further, in the data memory D-MEM, a store buffer is provided to encapsulate the disturbance of a pipeline owing to delay of store data.

In reference to FIG. 17, a second program assembled for the data processor in association with the third embodiment of the invention is exemplified. In the instruction fetch flow, load of codes for flows of data processing of load store and execution to the respective instruction queues IQ are performed. The instruction queue load & loop setting instruction "iqlp/ls_LS0, 8, 5, 8, N" is an instruction which includes loading eight instructions from a label _LS0 to the instruction queue IQ of the load store nanoprocessor LSN and making setting so that fifth to eighth instructions are made to loop N times. Likewise, the instruction "iqlp/ex_EX0, 2, 1, 2, N" is an instruction which includes loading two instructions from a label _EX0 to the instruction queue IQ of the execution nanoprocessor EXN and making setting so that the first and second instructions are made to loop N times.

In the load store flow, the top addresses of the arrays a to d are set to r0 to r3 before the loop. In the loop, elements of the arrays a and b are sequentially loaded in ascending order of addresses according to the instructions "mov @r0+, r0/*ex*" and "mov @r1+, r1/*ex*". Then, results of addition and subtraction are sequentially stored into elements of the arrays c and d according to the instructions "mov r4, @r2+" and "mov r5, @r3+". Meanwhile, the execution flow is similar to that shown in FIG. 14, however the destination is changed from the store nanoprocessor STN to the load store nanoprocessor LSN, and therefore the field np is changed from "st" to "ls."

In reference to FIG. 18, an action of the program shown in FIG. 17 which the data processor in association with the third embodiment conducts is shown. First, the two instructions of the instruction fetch flow are executed, thereby to set up the instructions for forcing the load store and execution flows to run in the instruction queues IQ of the load store and execution nanoprocessors LSN and EXN shown in FIG. 16. The details of the actions are the same as those in the case of FIG. 15. Then, the load store flow can be made to run from the fifth cycle, and the execution flow can be made to run from the sixth cycle.

In the load store flow, pointers to the four arrays a to d are set up using the first four instructions. As a result, the registers r0 and r3 are made valid sequentially. After that, the data processor goes into the loop action, and executes four instructions which are composed of two load instructions "mov @r0+, r0/*ex*" and "mov @r1+, r1/*ex*" and two store instructions "mov r4, @r2+" and "mov r5, @r3+" repeatedly. However, actions according to the execution flow are similar to those described in reference to FIG. 15. As the start of load in the load store flow is delayed by two cycles in comparison to that in the case of FIG. 15, actions in the execution flow are also delayed by two cycles.

As for these exemplary actions, the load latency is three cycles. Therefore, e.g. load data involved in the load instruction started in the tenth cycle is made valid at the end of the twelfth cycle, and becomes available from the thirteenth cycle. The store instruction "mov r4, @r2+" in the eleventh cycle in the load store flow uses a result of execution of the addition instruction "add r0/k, r1/k, r4/ls" in the thirteenth cycle of the execution flow. However, processing of the result of execution is started in advance without being made to wait, and the store buffer absorbs the delay of the result of the execution. Likewise, the store instruction "mov r5, @r3+" in the twelfth cycle uses a result of execution of the subtraction instruction "sub r0, r1, r4/ls" in the fourteenth cycle. However, processing of the result of execution is started in advance without being made to wait. As a result, the load store flow is not stalled, and an instruction is executed in every cycle in the flow, whereby the maximum throughput in the case where the number of memory ports is one can be maintained.

In reference to FIG. 19, the detail of a data-dependent stall avoidance action by the store buffer is shown. Here, the actions between eleventh to sixteenth cycles in FIG. 18 are shown. The store instruction "mov r4, @r2+" in the eleventh cycle of the load store flow performs instruction decode ID and register read RR in the stage D, performs data address generation DAG in the stage E, performs address write back WB and store buffer address write SBA at the stage M1, and waits for arrival of store data. Now, it is noted that when the data memory D-MEM is a cache, judgment of a hit miss is made. Also, in the case where address translation and memory protection check are performed, those are carried out in the stage M1. Store data is generated by the addition instruction "add r0/k, r1/k, r4/ls" in the thirteenth cycle of the execution flow. Therefore, the store data is made valid in the register write stage WB of the addition instruction, and store buffer data write SBD is performed at this time. As for the time when it is possible to perform write to the data memory D-MEM immediately after that, the write to the data memory D-MEM is made to wait by one cycle and performed in the stage M1 of the store instruction "mov r4, @r2+" in the fifteenth cycle. This is because an access to a data array of the data memory D-MEM is performed in the stage M1 according to the load instruction "mov @r1+, r1/ex" in the fourteenth cycle. According to this store instruction, the address write back WB, store buffer address write SBA, etc. are performed as in the case of the store instruction in the eleventh cycle, however a data array access for data write is not performed. As a result, access to a data array from the store buffer is made possible. As described above, write to the memory from the store buffer is performed when no access to the data array occurs in the stage M1 of the subsequent instruction. As stated above, the store buffer enables the avoidance of data-dependent stall.

Fourth Embodiment

The first embodiment needs two nanoprocessors, and the second and third embodiments require two or more instruction flows. When a load instruction with a long latency is executed in advance, division of an instruction flow is the most effective. If the processing flow is divided only in this case, the processing power of a data processor can be enhanced even when an arrangement similar to that of an existing processor is adopted.

In reference to FIG. 20, a data processor in association with the fourth embodiment of the invention is exemplified. In this embodiment, the central processing unit, which is also referred to as CPU simply, has a structure similar to that of an existing processor. Therefore, the detailed description of its inside structure is omitted here. The CPU is connected with a data transfer unit DTU, an instruction memory I-MEM, a data memory D-MEM and an expanded memory E-MEM. The CPU outputs an instruction address IA to the instruction memory I-MEM, and receives an instruction INST from the memory. The CPU outputs a data address DA to the data memory D-MEM and receives load data LD, or outputs a data address DA and store data SD to store the data address and store data therein. The CPU sends a data address, a transfer type, etc. as DTINF to the data transfer unit DTU. When the data transfer unit DTU outputs a data address EDA, the CPU receives load data ELD or outputs store data ESD in synchronization with the output by data transfer unit. Also, the CPU includes a load data overrun buffer LDOB in preparation for the case where the CPU fails to receive load data into its register, forwarding hardware or the like.

Figures 21, 22, 23:
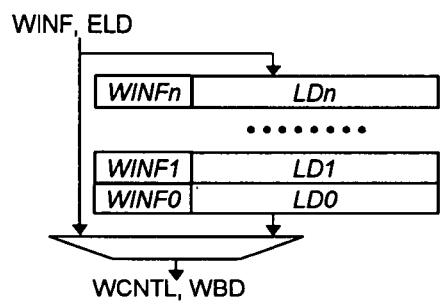
FIG. 21 is a view showing an example of the first program assembled for the fourth embodiment.
FIG. 22 is an explanatory view exemplifying an action of the program of FIG. 21 by a data processor of the fourth embodiment when the load latency is ten.
FIG. 23 is an explanatory view exemplifying a configuration of a load over overrun buffer.

In reference to FIG. 21, a first program assembled for the data processor in association with the fourth embodiment is exemplified. The first five instructions are for a request for successive load from the array a to the data transfer unit DTU. According to the first instruction, a control register address of a transfer channel ch1 of the data transfer unit DTU is stored in a register r0. According to the second instruction, a pointer to the array a is stored in a register r1. Then, according to the third instruction, the pointer to the array a stored in the register r1 is written into an address register of the transfer channel ch1 indicated by the register r0. At that time, a value of the register r0 is held. According to the fourth instruction, control information ch1*cntl* of the transfer channel ch1 is written into the register r1. Then, according to the fifth instruction, the control information ch1*cntl* stored in the register r1 is written into a control register of the transfer channel ch1 indicated by the register r0. The subsequent five instructions serve to cause a request for successive load from the array b to transfer channel ch2 of the data transfer unit DTU, likewise. Thereafter, the data processor stores a pointer to the array c in a register r2, stores the number of repeat N in a register r3, and then completes the processing for initialization.

In the loop part, the processor receives values of the arrays a and b from the transfer channels ch1 and ch2 by use of the registers r4 and r5 respectively, adds the received values according to the addition instruction, decrements a loop parameter r3, i.e. the value of the register r3, makes a check on whether the parameter is zero to cause a flag to reflect the result of the check, stores the result r5 of the addition, i.e. the value of the register r5, in the array c indicated by the register r2, and checks the flag according to a branch instruction. If r3 is zero, the processor goes out the loop, otherwise returns to the top of the loop.

In reference to FIG. 22, an action of the program of FIG. 21 when the load latency is ten, which the data processor in association with the fourth embodiment performs, is shown. The CPU in associated with the fourth embodiment is a two-instruction concurrent issue type super-scalar processor. First, the data processor executes twelve instructions in the initialization part in pairs and forces the data transfer unit DTU to start successive load from the arrays a and b. Further, the data processor stores a pointer to the array c in the register r2, stores the number of repeat N in the register r3, and then completes the processing for initialization.

In the data transfer unit DTU, after the setups of the transfer channels ch1 and ch2 are completed in the third and fifth cycles respectively, load is started. As it is assumed that the latency is ten, the initial data of the transfer channels ch1 and ch2 arrive at the CPU at the ends of the twelfth and fourteenth cycles respectively. As a result, the loop part is started in the fifteenth cycle. When the data processor executes the addition instruction in the fifteenth, the register r4 is made invalid, and therefore the subsequent data from the transfer channel ch1 is written in the register r4. Further, when the data processor executes the store instruction in the sixteenth cycle, the register r5 is made invalid, and therefore the subsequent data from the transfer channel ch2 is written in the register r5. During the time when the write of the subsequent data from the transfer channels is performed, the decrement & test instruction "dt r3" and branch instruction "bf_L20", which are for loop control, are also executed. After that, the four instructions are executed repeatedly. As a result, even with an elongated latency of ten cycles, the data processor can proceed the processing using a small number of registers without any delay. In addition, when a loop structure definition instruction as in the first embodiment is used, the main body of the loop is configured of two instructions, and therefore one loop can be executed in one cycle. However, in this case, it would become the bottleneck of memory access and as such, it is necessary to take a measure selected from: to make the data transfer unit DTU load data in sets of four; to combine data in sets of four in store processing; and to replace the memory with multibank or multiport type one.

In reference to FIG. 23, an example of the load data overrun buffer LDOB is shown. The load data overrun buffer accepts write information WINF together with load data ELD. When write is impossible because registers are valid, or there is not a register write port out of use, the information and load data are written somewhere of the areas $WINF_0$ to $WINDF_n$ and $LD_0$ to $LD_n$ of the load data overrun buffer. Then, when the write is enabled, the information and load data are read out from the buffer and written in the registers. To supply load data without delay even with a latency of ten cycles, load data overrun buffers LDOB corresponding to ten cycles are needed. The time when data is consumed is ten cycles later at earliest. Therefore, in the case where data are not consumed at all after the data have been loaded for ten cycles successively with expectation that the data are consumed in every cycle, the load data can stay in the load data overrun buffer LDOB if the eleventh load is not issued. After that, if one piece of data is loaded each time one piece of data is consumed, sufficient load data can be supplied, and thus the bottleneck of load data never causes a stall.

Fifth Embodiment

In the first to fourth embodiments, a complete reform of the instruction system is performed, thereby to allow the instructions to invalidate registers. In contrast, the fifth embodiment enables invalidation of registers which is a subject matter of the invention with the existing instruction system left as it is. The fifth embodiment is identical with the fourth embodiment in arrangement except that the instruction system is replaced. Specifically, a register invalidation instruction is added to the instruction system of a typical processor. FIG. 24 exemplifies a first program assembled for a data processor in association with the fifth embodiment. The initialization part thereof is similar to that shown in FIG. 21, however a loop structure definition instruction is used thereby to reduce the number of instructions in a loop as in the case of the program shown in FIG. 8. The loop part is arranged so that the register is invalidated after use thereby to allow the data transfer unit DTU to supply subsequent data. Specifically, the data processor adds data of two arrays according to the addition instruction "add r4, r5" and then invalidates the register r4 according to the register invalidation instruction "regi r4" thereby to enable new load data to be written into the register r4. Further, the processor stores a result of the addition according to the store instruction "mov r5, @r2+", and then invalidates the register r5 according to the register invalidation instruction "regi r5" thereby to allow new load data to be written into the register r5.

In reference to FIG. 25, an action of the program of FIG. 24 when the load latency is ten, which the data processor in association with the fifth embodiment performs, is shown. The CPU is a two-instruction concurrent issue type superscalar processor as in the case of the fourth embodiment. First, the processor executes fourteen instructions in the initialization part in pairs, and forces the data transfer unit DTU to start successive load from the arrays a and b. Further, the data processor stores a pointer to the array c in the register r2, defines a loop structure, and then completes the processing for initialization. The loop part begins in fifteenth cycle as in the case of the fourth embodiment. The data processor executes the addition instruction "add r4, r5" and register invalidation instruction "regi r4" in the fifteenth cycle, executes the store instruction "mov r5, @r2+" and register invalidation instruction "regi r5" in the sixteenth cycle, and thereafter repeats the actions of the two cycles. In comparison with the fourth embodiment, the number of instructions is increased because of addition of the register invalidation instruction. However, the CPU performs no load, which eliminates the need for executing a load instruction. Therefore, when an interpretation such that the register invalidation instruction is executed instead of the load instruction is made, the number of executions of instructions is the same as that of a common processor. According to the embodiment, it becomes possible to encapsulate the load latency more efficiently in comparison to loop unrolling by a large number of registers and out-of-order execution by large-scale hardware adopted for a common processor.

Sixth Embodiment

The first and second programs exemplified above have a loop structure, however the processes by the programs are not changed depending on their conditional branches. Further, those programs do not cause a request to stop use of a register to which data is loaded because of a change in flow, and a request to use a invalidated register again. However, the sixth embodiment makes it possible to cope with the change in register use condition involved with the change in flow, by means of the register invalidation instruction introduced in the fifth embodiment and a register validation instruction additionally introduced.

In reference to FIG. 26, a C language program of a character string comparison program and an assembler program for the third and fifth embodiments are exemplified. As for speeded up character string comparison programs, a method of comparing characters concurrently is common. However, such method complicates pre-processing and post-processing. Speeding up by widening the range of the processing is applicable independently of the invention. Therefore, in the example of FIG. 26, characters are individually handled according to the program.

The C language program will be described first. The action of the character string comparison program is changed depending on: what ordinal position the character on which a mismatch occurs is located in; or how many characters the character string on which a match is found consists of. Here, it is assumed that the arrays a and b contain character strings "card" and "car" respectively, and a mismatch occurs on the fourth character. In addition, the maximum character number of character strings is assumed to be N. In the main body of the program, the processor reaches a mismatch on i-th character after N times of loops, or goes out of the loop after finishing a character string and then generates a difference between character codes. Now, the variable c is a register parameter. When the processor does not go out the loop in comparison of mismatch, i.e. when the character strings matches up to each other, in regard to only one character string, the end of the string is checked. It is unnecessary to check the other character string because the strings match up to each other.

Next, the assembler program for the third embodiment will be described. In the instruction fetch flow, load of codes for load store and execution data processing flows to the instruction queues IQ is performed. First, the instruction queue load & loop setting instruction "iqlp/ls_LS0, 4, 3, 4, N" is an instruction which includes loading four instructions from a label _LS0 to the instruction queue IQ of the load store nanoprocessor LSN, and making setting so that the third and fourth instructions are made to loop N times. Likewise, the instruction "iqlp/ex_EX0, 6, 2, 3, N" includes loading six instructions from a label _EX0 to the instruction queue IQ of the execution nanoprocessor EXN, and making setting so that the second and third instructions are made to loop N times. Setting is made so that the program branches to a label _EX3 according to the branch setting instructions "bf/ex_EX1, _EX3" and "bt/ex_EX2, _EX3" when the flag is FALSE after execution of the instruction of label _EX1 and when the flag is TRUE after execution of the instruction of label _EX2.

In the load store flow, the top addresses of the arrays a and b are set to r0 and r1 prior to a loop. In the loop, elements of the arrays a and b are sequentially loaded in ascending order of addresses according to the instructions "mov.b @r0+, r0/*ex*" and "mov.b @r1+, r1/*ex*".

In the execution flow, the value "0" showing the end of a character string is set in the register r2 prior to a loop. In the loop, two values which are loaded according to the comparison instruction "cmp/eq r0/*k*, r1" are compared to update the flag. At this time, the value of the register r0 which will be used again is held. Then, when the flag is FALSE, the program branches to the label _EX3 according to the above-described branch setting. Further, one of the values loaded according to the comparison instruction "cmp/eq r0, r2/*k*" is compared with the value "0" showing the end of the character string to update the flag. At this time, the value of the register r2 which will be used again is held. Then, when the flag is TRUE, the program branches to the label _EX3 according to the above-described branch setting. When the processor goes out of the loop, the registers r0 and r1 are made valid in order to calculate a difference between codes of characters on which a mismatch occurs. In this flow, the register validation instruction "regv r0, r1" for making two registers valid is used. After that, the difference between codes of characters on which a mismatch occurs is calculated according to the subtraction instruction "sub r0, r1". At the end, the register r2, which has been unnecessary, but not invalidated yet, is made invalid according to the register invalidation instruction "regi r2".

Next, the assembler program for the fifth embodiment will be described. The initialization part is similar to that for the first program shown in FIG. 24. In the loop part, two values loaded according to the comparison instruction "cmp/eq r4, r5" are compared to update the flag. Then, when the flag is FALSE, the program branches to the label _L03 according to the branch instruction "bf_L03". When the flag is TRUE, the register r5 is invalidated by means of the subsequent register invalidation instruction "regi r5" thereby to enable new load data to be written in the register r5. Next, one of the values loaded according to the comparison instruction "cmp/eq r4, r2" is compared with the value "0" showing the end of a character string to update the flag. When the flag is TRUE, the program branches to the label _EX2 according to the branch instruction "bt_L03". When the flag is FALSE, the register r4 is invalidated by means of the subsequent register invalidation instruction to enable new load data to be written in the register r4. Thereafter, the six instructions are repeated according to the loop structure. When the processor goes out of the loop as a result of the second comparison, the register r5 has been already invalidated and as such, an instruction is executed from the label _L02, the register r5 is valid according to the register validation instruction "regv r5". Finally, the difference between codes of characters on which a mismatch occurs is calculated according to the subtraction instruction "sub r4, r5".

In reference to FIG. 27, an action of the assembler program for the third embodiment shown in FIG. 26, which the data processor in association with the third embodiment performs, is shown. First, two instructions in the instruction fetch flow are executed thereby to set up an instruction for executing load store and execution flows in the instruction queues IQ of the load store and execution nanoprocessors LSN and EXN. Further, a conditional branch is set according to the subsequent two instructions. Then, it becomes possible to execute the load store flow from the fifth cycle. The execution flow can be executed from the sixth cycle.

In the load store flow, according to the first two instructions, pointers to the two arrays a and b are set up. As a result, the registers r0 and r1 are made valid sequentially. After that, the data processor goes into the loop action, and executes two load instructions "mov @r0+, r0/*ex*" and "mov @r1+, r1/*ex*" alternately.

On the other hand, in the execution flow, the processor writes the value "O" showing the end of a character string into the register r2 in the sixth cycle, and waits for load data to be made valid. As for these exemplary actions, the load latency is three cycles. Therefore, load data of the load instructions which starts in seventh and eighth cycles become available from tenth and eleventh cycles. In order to use the load data, execution of the comparison instruction "cmp/eq r0, r1/*k*" lying at the top of the flow is started in the eleventh cycle. The comparison instructions after this comparison instruction never stall because load data have been prepared. After that, a mismatch of the character string occurs on the fourth character, and therefore the flag is turned to FALSE as a result of the comparison instruction "cmp/eq r0, r1/*k*" in the seventeenth cycle. Then, the processor cancels execution of instructions in the eighteenth and nineteenth cycles of the execution flow, and starts executing an instruction in the twentieth cycle after it goes out of the loop. At this time, execution of a load instruction in the load store flow is made to proceed forward, and load instructions in and after fifteenth cycle are cancelled. The detail of the cancel will be described later. Then, in the execution flow, the registers r0 and r1, which have been invalidated in the twentieth cycle, are made valid according to the register validation instruction "regv r0, r1". After that, the difference between codes of characters on which a mismatch occurs is calculated according to the subtraction instruction "sub r0, r1". At the end, the register r2 is made invalid according to the register invalidation instruction "regi r2".

In reference to FIG. 28, an action of load cancel by the execution nanoprocessor EXN in the action flow shown in FIG. 27 is exemplified. The result of comparison is settled in the execution (E) stage of the comparison instruction "cmp/eq r0, r1/k" in the seventeenth cycle. Based on the result, the write back (WB) stage of the load instruction "mov @r0+, r0/ex" in the fifteenth cycle is cancelled. It is necessary to cancel many processes other that this, so the timing is made slow. However, it is possible to make a cancel signal fan out. When the timing is tight, it is sufficient to increase the number of pipeline stages thereby to delay the stage WB.

In reference to FIG. 29, an action of the assembler program for the fifth embodiment shown in FIG. 26(3), which the data processor of the fifth embodiment performs, is shown. First, the processor executes fourteen instructions of the initialization part in pairs, and forces the data transfer unit DTU to start successive load from the arrays a and b. Further, the data processor stores a pointer to the array c in the register r2, defines a loop structure, and then completes the processing for initialization. When processing through the data transfer unit DTU is performed, there is an overhead for setup. Therefore, when the overhead is regarded as taking two cycles, the top of load data arrives in five cycles. In this case, the start of the loop part is in the tenth cycle. Now, the branch processing proceeds without stall according to Not Taken prediction. In contrast, in the case of Taken, a two-cycle stall occurs from the comparison instruction to generate a flag. In this case, the processor executes the comparison instruction "cmp/eq r4, r5" and the conditional branch instruction "bf_L03" in the tenth cycle; the register invalidation instruction "regi r4" and the "comparison instruction "cmp/eq r5, r2" in the eleventh cycle; and the conditional branch instruction "bt_L02" and the register invalidation instruction "regi r5" in the twelfth cycle. Then, after invalidation of the registers by two register invalidation instructions, new load data is written in the registers, and thus the processing is made to proceed. The invalidation instruction looks like a load instruction with a latency of one. It is possible to make arrangement so that the invalidation instruction looks like a load instruction with a latency of zero. However, in this case, there is a high probability that the critical path of the control system becomes strict. This is because the register invalidation instruction of load data and decode of load data use instruction are performed concurrently. After that, a mismatch occurs on the fourth character of the character string and as such, the mismatch is detected according to the comparison instruction in the nineteenth cycle. Then, the program is made to branch to the subtraction instruction of the label _L03 according to the conditional branch instruction. At this time, the four instructions in the loop are cancelled. Particularly, as the register invalidation instruction is also cancelled, it is unnecessary to make a register valid prior to execution of the subtraction instruction. For example, in the case where a character string in the array a is "car" which is the same as that of the array b, a match occurs on the fourth character, which is the value "0" showing the end of the character string. Thus, as a result of execution of the comparison instruction in the twentieth cycle, the flag becomes TRUE, and then the program branches to the label _L02 according to the conditional branch instruction in the twenty-first cycle. In this case, invalidation of the register r5 is cancelled, however the register r4 has been invalidated and as such, the register r4 is made valid according to the register validation instruction "regv r4" and then the subtraction instruction is executed. As stated above, only adding register invalidation and validation instructions enables exacting synchronization with the data transfer unit DTU working independently, and can facilitate encapsulation of the load latency. When the program is made to branch prior to the register invalidation instruction, the need for validating a register can be eliminated. The register validation instruction is not necessarily required, however it contributes to the performance and the facility of programming.

While the invention which the inventor made has been described specifically above based on the embodiment, the invention is not so limited. It is needless to say that various modifications and changes may be made without departing from the subject matter hereof.

For example, an example of an action is not limited to the programs described in C language exemplified in FIGS. 1, 14 and 26. The invention is widely applicable to execution of an arbitrary program other than those programs.

What is claimed is:

1. A data processor comprising a plurality of data processing circuits executing different instruction flows respectively,
   wherein each of the data processing circuits has
   a plurality of registers to which the instruction flows refer, and
   a flag bit showing a validity with respect to data kept in the plurality of registers on an individual register basis,
   when executing a first instruction for directing an operation for writing data in the register of the other data processing circuit, the data processing circuit confirms whether or not the register targeted for the direction of the writing operation according to the first instruction is invalid, waits for the register to be made invalid if the register is not invalid, and performs the writing operation after the register is made invalid,
   when executing a second instruction for providing a direction for invalidating data of the register referred to by use of the corresponding flag bit concurrently with the reference to the register, the data processing circuit suspends execution of the reference until the register is made valid if the register targeted for the direction of data invalidation by the second instruction is invalid,
   the data processing circuit performs control for invalidating the register to which a reference has been made after the second instruction has been executed, and
   the first and second instructions constitute an instruction set including a load instruction, an address generation instruction, a store instruction, and a memory access instruction.

2. The data processor of claim 1, wherein the data processing circuit executing the load instruction and the address generation instruction is separated from the data processing circuit executing the store instruction and the address generation instruction.

3. The data processor of claim 1, wherein the data processing circuit executing the memory access instruction and address generation instruction is separated from the data processing circuit executing another execution instruction.

4. The data processor of claim 1, further comprising:
   a data processing circuit for executing instruction fetch; and
   a data processing circuit for executing an arithmetic operation,
   wherein an instruction queue of the data processing circuit for executing an arithmetic operation is regarded as a register handled by the data processing circuit for executing instruction fetch, a data processing device for executing instruction fetch executes, as the first instruction, an instruction having a direction for write to an entry of the instruction queue, and a data processing device for executing an arithmetic operation executes, as the second instruction, an instruction for directing invalidation of the entry by use of a corresponding flag bit after the reference to the entry of the instruction queue, and performs instruction exchange from the data processing circuit for executing instruction fetch to the data processing circuit for executing an arithmetic operation.

5. The data processor of claim 1, wherein the first instruction has a designation field of a first parameter for identifying the data processing circuit targeted for write corresponding to a destination register field.

6. The data processor of claim 5, wherein the first instruction is a load instruction for transferring data from a memory designated with a register indirect addressing mode to a register.

7. The data processor of claim 1, wherein the second instruction has a designation field of a second parameter for directing whether to invalidate the register or not after reference corresponding to a register field.

8. The data processor of claim 7, wherein the register field having the designation field of the second parameter is a field for designating a read register.

9. The data processor of claim 8, wherein the register field having a designation field of the second parameter does not include a field for designating a write register and fields for designating read and modify registers.

10. The data processor of claim 1, further comprising a plurality of register valid bits each showing whether a register operand kept by a corresponding register is valid or invalid in instruction decode.

11. The data processor of claim 10, wherein when executing the first instruction, if the register valid bit indicates that the register operand is valid, the data processing circuit waits for the register operand being made invalid and then updates the register operand.

12. The data processor of claim 1, wherein when executing the first instruction, if the register is not invalid, the register is made invalid by adding at least one new cycle into a flow of the second instruction.

13. A data processor comprising a plurality of data processing circuits executing different instruction flows respectively, wherein each of the data processing circuits has a plurality of registers to which the instruction flows refer, and a flag bit showing a validity with respect to data kept in the plurality of registers on an individual register basis, an instruction set for the plurality of data processing circuits includes a first instruction for directing an operation for forcing one of the data processing circuits to write data in the register of the other data processing circuit, and a second instruction for providing a direction for data invalidation to a flag bit of the register targeted for the reference concurrently with the reference to the register of the data processing circuit, and when executing the first instruction, the data processing circuit confirms whether or not the register targeted for the direction of the writing operation according to the first instruction is invalid, waits for the register to be made invalid if the register is not invalid, and performs write after the register is made invalid.

14. The data processor of claim 13, wherein when executing the second instruction, the data processing circuit suspends execution of the referring instruction until the register is made valid if the register targeted for the direction of data invalidation by the second instruction has been invalid, and the data processing circuit performs control for invalidating the register to which a reference has been made after the second instruction has been executed.

15. The data processor of claim 13, further comprising a plurality of register valid bits each showing whether a register operand kept by a corresponding register is valid or invalid in instruction decode.

16. The data processor of claim 15, wherein when executing the first instruction, if the register valid bit indicates that the register operand is valid, the data processing circuit waits for the register operand being made invalid and then updates the register operand.

17. The data processor of claim 13, wherein when executing the first instruction, if the register is not invalid, the register is made invalid by adding at least one new cycle into a flow of the second instruction.

* * * * *